US012182737B2

(12) United States Patent
Franc De Ferriere et al.

(10) Patent No.: US 12,182,737 B2
(45) Date of Patent: Dec. 31, 2024

(54) ELECTRONIC SYSTEM AND METHOD FOR CLAIMING AND RESERVING WORK AREAS

(71) Applicant: Logitech Europe S.A., Lausanne (CH)

(72) Inventors: Gregory Franc De Ferriere, Ap Lei Chau (HK); Henry Levak, San Mateo, CA (US); Aleksandr Kirov, San Jose, CA (US); Trevor Alan Rush, New York, NY (US); Karthik Rajagopal, Cupertino, CA (US)

(73) Assignee: Logitech Europe S.A., Lausanne (CH)

( * ) Notice: Subject to any disclaimer, the term of this patent is extended or adjusted under 35 U.S.C. 154(b) by 501 days.

(21) Appl. No.: 17/398,976

(22) Filed: Aug. 10, 2021

(65) Prior Publication Data
US 2023/0049989 A1    Feb. 16, 2023

(51) Int. Cl.
G06Q 10/00 (2023.01)
G06Q 10/02 (2012.01)
G06Q 10/1093 (2023.01)

(52) U.S. Cl.
CPC ......... *G06Q 10/02* (2013.01); *G06Q 10/1093* (2013.01)

(58) Field of Classification Search
None
See application file for complete search history.

(56) References Cited

U.S. PATENT DOCUMENTS

| | | | |
|---|---|---|---|
| 4,476,463 A | 10/1984 | Ng et al. | |
| 4,677,428 A | 6/1987 | Bartholow | |
| 4,705,942 A | 11/1987 | Budrikis et al. | |
| 4,785,564 A | 11/1988 | Gurtler | |
| 4,794,634 A | 12/1988 | Torihata et al. | |
| 5,117,071 A | 5/1992 | Greanias et al. | |
| 5,434,617 A | 7/1995 | Bianchi | |
| 5,488,204 A | 1/1996 | Mead et al. | |
| 5,568,292 A | 10/1996 | Kim | |

(Continued)

FOREIGN PATENT DOCUMENTS

| | | |
|---|---|---|
| CN | 109679326 A | 4/2019 |
| WO | 2020249959 A1 | 12/2020 |

OTHER PUBLICATIONS

Eileen Burbidge et al. "Google Introduces New Open Format and Developer Tools for Working with BLE Beacons", Disrupt London. https://techcrunch.com/2015/07/14/google-introduces-open-format-and-developer-tools-for-bluetooth-le-beacons/.

(Continued)

*Primary Examiner* — Tonya Joseph
(74) *Attorney, Agent, or Firm* — Patterson + Sheridan, LLP

(57) ABSTRACT

Embodiments herein generally relate to an electronic system and a method of monitoring and providing feedback to adjust and improve the allocation of, use of, and/or control over one or more physical spaces. Embodiments of the disclosure can provide an electronic system and method that allows a user to reserve a work space within a room or building. The methods disclosed herein can include inputting one or more desk preferences into one or more processing devices, receiving, at one or more electronic devices, the desk preferences, determining whether a suitable desk matching the desk preferences is available, and generating an alert on the one or more electronic devices regarding the availability of the suitable desk.

18 Claims, 16 Drawing Sheets

(56) References Cited

U.S. PATENT DOCUMENTS

| | | |
|---|---|---|
| 5,570,113 A | 10/1996 | Zetts |
| 5,610,629 A | 3/1997 | Baur |
| 5,659,332 A | 8/1997 | Ishii et al. |
| 5,677,744 A | 10/1997 | Yoneda et al. |
| 5,790,106 A | 8/1998 | Hirano et al. |
| 5,825,352 A | 10/1998 | Bisset et al. |
| 5,880,411 A | 3/1999 | Gillespie et al. |
| 5,914,708 A | 6/1999 | LaGrange et al. |
| 5,959,617 A | 9/1999 | Bird et al. |
| 6,002,387 A | 12/1999 | Ronkka et al. |
| 6,100,538 A | 8/2000 | Ogawa |
| 6,133,906 A | 10/2000 | Geaghan |
| 6,188,391 B1 | 2/2001 | Seely et al. |
| 6,323,846 B1 | 11/2001 | Westerman et al. |
| 6,392,694 B1 | 5/2002 | Bianchi |
| 6,441,362 B1 | 8/2002 | Ogawa |
| 6,504,530 B1 | 1/2003 | Wilson et al. |
| 6,529,189 B1 | 3/2003 | Colgan et al. |
| 6,597,348 B1 | 7/2003 | Yamazaki et al. |
| 6,603,867 B1 | 8/2003 | Sugino et al. |
| 6,611,281 B2 | 8/2003 | Strubbe |
| 6,667,740 B2 | 12/2003 | Ely et al. |
| 6,681,034 B1 | 1/2004 | Russo |
| 6,731,334 B1 | 5/2004 | Maeng et al. |
| 6,803,906 B1 | 10/2004 | Morrison et al. |
| 6,829,391 B2 | 12/2004 | Comaniciu et al. |
| 6,856,259 B1 | 2/2005 | Sharp |
| 7,015,894 B2 | 3/2006 | Morohoshi |
| 7,084,933 B2 | 8/2006 | Oh et al. |
| 7,098,894 B2 | 8/2006 | Yang et al. |
| 7,298,733 B2 | 11/2007 | Sakai et al. |
| 7,349,008 B2 | 3/2008 | Rui et al. |
| 7,372,455 B2 | 5/2008 | Perski et al. |
| 7,433,327 B2 | 10/2008 | Harville et al. |
| 7,567,242 B2 | 7/2009 | Perkins et al. |
| 7,612,767 B1 | 11/2009 | Griffin et al. |
| 7,649,527 B2 | 1/2010 | Cho et al. |
| 7,663,607 B2 | 2/2010 | Hotelling et al. |
| 7,688,315 B1 | 3/2010 | Gettemy et al. |
| 7,746,401 B2 | 6/2010 | Wu et al. |
| 7,855,718 B2 | 12/2010 | Westerman |
| 7,876,923 B2 | 1/2011 | Finnegan et al. |
| 7,940,432 B2 | 5/2011 | Shih et al. |
| 8,094,133 B2 | 1/2012 | Sato et al. |
| 8,094,193 B2 | 1/2012 | Peterson et al. |
| 8,122,384 B2 | 2/2012 | Partridge et al. |
| 8,130,203 B2 | 3/2012 | Westerman |
| 8,134,542 B2 | 3/2012 | Hagen et al. |
| 8,237,764 B1 | 8/2012 | Chen et al. |
| 8,243,041 B2 | 8/2012 | Westerman |
| 8,243,049 B2 | 8/2012 | Vos |
| 8,261,211 B2 | 9/2012 | Pahud et al. |
| 8,278,571 B2 | 10/2012 | Orsley |
| 8,284,254 B2 | 10/2012 | Romanowich et al. |
| 8,358,328 B2 | 1/2013 | Friel et al. |
| 8,368,752 B2 | 2/2013 | Lin et al. |
| 8,471,889 B1 | 6/2013 | Lee et al. |
| 8,547,414 B2 | 10/2013 | Sheeley |
| 8,659,638 B2 | 2/2014 | Chao et al. |
| 8,780,168 B2 | 7/2014 | Corley et al. |
| 8,842,161 B2 | 9/2014 | Feng et al. |
| 8,872,882 B2 | 10/2014 | Shanmukhadas et al. |
| 8,885,057 B2 | 11/2014 | Mock |
| 8,913,103 B1 | 12/2014 | Sargin et al. |
| 9,001,183 B2 | 4/2015 | Mauchly |
| 9,077,906 B1 | 7/2015 | Tsai et al. |
| 9,237,307 B1 | 1/2016 | Vendrow |
| 9,270,941 B1 | 2/2016 | Lavelle |
| 9,338,395 B2 | 5/2016 | Wang et al. |
| 2002/0106137 A1 | 8/2002 | Chen et al. |
| 2002/0175903 A1 | 11/2002 | Fahraeus et al. |
| 2004/0003409 A1 | 1/2004 | Berstis |
| 2004/0008189 A1 | 1/2004 | Clapper et al. |
| 2004/0095333 A1 | 5/2004 | Morag et al. |
| 2006/0026521 A1 | 2/2006 | Hotelling et al. |
| 2006/0250381 A1 | 11/2006 | Geaghan |
| 2007/0024706 A1 | 2/2007 | Brannon et al. |
| 2007/0030258 A1 | 2/2007 | Pittel et al. |
| 2008/0128180 A1 | 6/2008 | Perski et al. |
| 2008/0150918 A1 | 6/2008 | Hagen et al. |
| 2008/0297487 A1 | 12/2008 | Hotelling et al. |
| 2008/0309625 A1 | 12/2008 | Krah et al. |
| 2009/0174530 A1 | 7/2009 | Yen et al. |
| 2009/0262637 A1 | 10/2009 | Badaye et al. |
| 2009/0284579 A1 | 11/2009 | Knaz |
| 2010/0013796 A1 | 1/2010 | Abileah et al. |
| 2010/0020037 A1 | 1/2010 | Narita et al. |
| 2010/0051356 A1 | 3/2010 | Stern et al. |
| 2010/0252335 A1 | 10/2010 | Orsley |
| 2010/0289754 A1 | 11/2010 | Sleeman et al. |
| 2010/0315384 A1 | 12/2010 | Hargreaves et al. |
| 2011/0043489 A1 | 2/2011 | Yoshimoto et al. |
| 2011/0050843 A1 | 3/2011 | Cheng et al. |
| 2011/0099493 A1 | 4/2011 | Yu et al. |
| 2011/0116538 A1 | 5/2011 | Chuang et al. |
| 2011/0128350 A1 | 6/2011 | Oliver et al. |
| 2011/0131498 A1 | 6/2011 | Chao et al. |
| 2011/0141314 A1 | 6/2011 | Liu et al. |
| 2011/0148759 A1 | 6/2011 | Hwang et al. |
| 2011/0148792 A1 | 6/2011 | Hwang et al. |
| 2012/0019611 A1 | 1/2012 | Wu et al. |
| 2012/0046102 A1 | 2/2012 | Tully |
| 2012/0068964 A1 | 3/2012 | Wright et al. |
| 2012/0158629 A1 | 6/2012 | Hinckley et al. |
| 2012/0169883 A1 | 7/2012 | Chang et al. |
| 2012/0206330 A1 | 8/2012 | Cao et al. |
| 2012/0223960 A1 | 9/2012 | Chiang et al. |
| 2012/0268626 A1 | 10/2012 | Lu et al. |
| 2012/0327041 A1 | 12/2012 | Harley et al. |
| 2012/0327042 A1 | 12/2012 | Harley et al. |
| 2013/0007499 A1 | 1/2013 | Moy |
| 2013/0059284 A1 | 3/2013 | Giedgowd, Jr. et al. |
| 2013/0183958 A1 | 7/2013 | Wesby |
| 2013/0329003 A1 | 12/2013 | Hsia et al. |
| 2013/0335508 A1 | 12/2013 | Mauchly |
| 2014/0043485 A1 | 2/2014 | Bateman et al. |
| 2014/0043493 A1 | 2/2014 | Bateman et al. |
| 2014/0043495 A1 | 2/2014 | Bateman et al. |
| 2014/0111600 A1 | 4/2014 | Schaefer et al. |
| 2014/0187149 A1 | 7/2014 | Lortz et al. |
| 2014/0313282 A1 | 10/2014 | Ma et al. |
| 2014/0313346 A1 | 10/2014 | Huang et al. |
| 2015/0022636 A1 | 1/2015 | Savransky |
| 2015/0109399 A1 | 4/2015 | Kuscher et al. |
| 2015/0110259 A1 | 4/2015 | Kaye et al. |
| 2015/0244853 A1 | 8/2015 | Shin et al. |
| 2016/0291861 A1 | 10/2016 | Song et al. |
| 2016/0294624 A1 | 10/2016 | Xia |
| 2017/0006162 A1 | 1/2017 | Bargetzi et al. |
| 2017/0099353 A1* | 4/2017 | Arora .............. H04W 4/70 |
| 2017/0346880 A1 | 11/2017 | Gay et al. |
| 2018/0020320 A1* | 1/2018 | Choi .............. H04W 76/14 |
| 2018/0272240 A1 | 9/2018 | Soudek et al. |
| 2020/0104804 A1* | 4/2020 | Fujimura .......... G06Q 10/1095 |
| 2020/0218324 A1* | 7/2020 | Decamp ............. G06F 1/1632 |
| 2021/0326779 A1* | 10/2021 | Spahn ............. G06Q 10/20 |

OTHER PUBLICATIONS

Patently Apple. Apr. 13, 2014.http://www.patentlyapple.com/patently-apple/2014/04/when-it-comes-to-ibeacon-readiness-ios-7-idevices-score-87-vs-android-devices-at-a-paltry-25.html.

Wojciech Borowicz et al. "Building Apps in the Age of Beacons and Internet of Things", Mar. 11, 2015. https://uxmag.com/articles/building-apps-in-the-age-of-beacons-and-internet-of-things.

Sarah Perez. Robin, A Company Enabling Sensor-Powered Smart Offices, Raises $1.4 Million. Jul. 7, 2014. https://techcrunch.com/2014/07/07/robin-a-company-enabling-sensor-powered-smart-offices-raises-1-35-million/.

Ron Amadeo, "Meet Google's "Eddystone"—A Flexible, Open Source iBeacon Fighter". Jul. 14, 2015. http://arstechnica.com/gadgets/2015/07/meet-googles-eddystone-a-flexible-open-source-ibeacon-fighter/.

(56) References Cited

OTHER PUBLICATIONS

Tips for Having a Great Conference. Aver HD Video Conferencing. http://www.averusa.com/video-collaboration/support/video-conferencing-tips.asp. 1991-2015.
EVC Series. Meeting collaboration made easy and affordable. http://www.averusa.com/video-collaboration/products/evc-series-video-conferencing.asp. 1991-2015.
AVer VCLink & ScreenShare. http://www.averusa.com/video-collaboration/products/vclink-and-screenshare.asp. 1991-2015.
Portable USB Video Conference Camera System for Small and Huddle Rooms. 1991-2015.
Plug-N-Play USB Video Conference Camera System for Mid to Large Rooms. http://www.averusa.com/video-collaboration/products/vc520-usb-conference-camera.asp. 1991-2015.
Meetio. <https://www.meetio.com/products/meetio-desk> Meetio Desk. 2021.
How to Cut to Different Shots. https://help.getmevo.com/hc/en-us/articles/223725908-How-to-Cut-to-Different-Shots. Sep. 27, 2016.
Enable Face Detection. https://help.getmevo.com/hc/en-us/articles/224041827-Enable-Face-Detection. Sep. 27, 2016.
Edit on the fly. https://getmevo.com/mevoapp. Downloaded Dec. 12, 2016.
So many ways to share. https://getmevo.com/sharing. Downloaded Dec. 12, 2016.
PC Nation—AVer Embedded 10-site HD MCU with built-in 18x PTZ Video Conferencing Endpoint, webpage https://www.pcnation.com/web/details/2Y7071/Aver-Embedded-10-Site-Hd-Mcu-With-Built-In-18x-Ptz-Video-Conferencing-Endpoint-COMESE910-00848090004382.
German Examination Report dated Apr. 28, 2020, for German Application No. 102017108589.0.
Jabra Noise Guide, https://www.jabra.com/business/office-headsets/jabra-noise-guide.
Logitech Sync, https://www.logitech.com/en-us/video-collaboration/products/sync.html.
Ubidreams Beacons, <https://www.ubidreams.fr/en/beacons-2/>.
Haines, 5 Things You Need To Know About Beacon Technology, https://www.wordstream.com/blog/ws/2018/10/04/beacon-technology, published Oct. 4, 2018.
<https://www.cisco.com/c/en/us/products/collaboration-endpoints/webex-desk-pro/index.html>, Webex Desk Pro.
The first workplace platform that puts people before places. <https://robinpowered.com/> 2021.
Embrava. <https://embrava.com/> 2021.
Condeco. How tomorrow will work. <https://www.condecosoftware.com/> 2021.

* cited by examiner

ELECTRONIC SYSTEM AND METHOD FOR CLAIMING AND RESERVING WORK AREAS

BACKGROUND OF INVENTION

Field of Invention

Embodiments disclosed herein generally relate to an apparatus and a method of monitoring and providing feedback to adjust and improve human interaction and activities, and, more specifically, to an electronic system, electronic device, and/or a method of using the same to improve human activities in a business, a home or an educational environment.

Description of the Related Art

Hotel desks, or "hot desks," have become a popular way to structure work environments. With hotel desks, a user reserves or claims a desk for a period of time, but is not assigned the desk on a long-term basis. This allows the user to have the flexibility to work remotely and to come into an office as needed. For example, a user may primarily work from home but come into the office on certain days of the week, for meetings, or for project milestones. Thus, the user needs a desk for a period of time that they are in the office.

However, there are several challenges to implementing a hotel desk environment. Desks may only be available on a first come-first serve basis. The user may not be able to secure a desk in a location where they can work productively such as in a low traffic or quiet area. The user may not be able to secure a desk amongst their team. The team may reserve more desks than are actually needed which prevents otherwise available desks from being used by other users. The company or other users may not know who is in the building or what desks are available at any given time. The company often has limited to no visibility into how the desks are used, so they cannot refine the environment to improve or optimize desk usage. These are just some of the challenges.

Several solutions exist to help implement the hotel desk environment. However, current systems for implementing and managing hotel desk environments have drawbacks. Current systems may require the company to work with a specialized team during an initial setup of the system. This requires a significant amount of initial effort for the company to transition to or implement the environment and may dissuade companies from doing so. Current systems may require the user to do something more than the user would normally do when using the desk. This requires the user to learn new habits and may create a reluctance to embrace the hotel desk environment.

Additionally, current conventional systems may constantly run a powered display at each desk to show the desk is available or unavailable. This results in excess power consumption and costs. Current systems may not be able to reserve a desk in advance and/or they may require the user to start using the desk to alert the system of the user's presence. This makes it challenging to acquire desks or space for multiple users that are part of one team and prefer to work together.

Current systems may also require a one-time authentication to start using the desk. This does not provide adequate insight into whether the user has left a desk and thus may unnecessarily prevent others from using the desk. Current systems may also require repeated requests for authentication. This may be distracting to the user and result in decreased productivity. Current systems may require an app on a cell phone to reserve or use the desk. This may force users to install an app they do not want or may exclude users that do not have a smartphone. Current systems may require to user to carry additional equipment, such as a badge to log in or to reserve, possess, or use the desk. This may prevent users from having a desk if the user does not have the equipment such as when the company does not have the equipment on hand or the user forgets the equipment at home.

Current systems are also often limited and perform a single function of managing desks. This results in a high cost for a single point solution. Current systems are also often not able to detect or manage peripherals used by users, such as keyboards, mice, webcams, printers, and the like. This may result in unauthorized reconfiguration, theft, degraded health, or lack of general uniformity of peripherals from desks. Further, the company must manually update software or firmware of current systems or peripherals, which is a tedious and costly process. Thus, the company is not able to properly manage the configuration of the environment or optimize the environment based on hotel desk usage.

Therefore, there is a need in the art for systems to provide and manage hotel desks and/or space in an office, educational space, library or home environment. There is also a need for a system, device(s) and methods that solves the problems described above.

SUMMARY OF INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a processor, cause the apparatus to perform the actions. Embodiments of the disclosure may provide a computer implemented method. The computer implemented method also includes receiving, by a first electronic device, a first set of user information from a processing device after a connection is formed between the first electronic device and the processing device. The method also includes authorizing the processing device to communicate with the first electronic device, where authorizing the processing device may include comparing at least a portion of the first set of user information with at least one of user identification data and work area reservation information retrieved from memory. The method also includes automatically assigning a work area to a user based on the connection formed between the first electronic device and the processing device. The method also includes generating, by the first electronic device, a notification that the work area is assigned to the user. The method also includes adjusting one or more characteristics of a first external device coupled to the first electronic device based on the received first set of user information. The method also includes receiving, by the first electronic device, a second set of user information from the processing device while the connection remains formed between the first electronic device and the processing device. The method also includes adjusting one or more characteristics of a second external device coupled to the first electronic device, or the first external device coupled to the first electronic device, based on the received second set of user information. Other embodiments of this aspect include corresponding computer systems, apparatus, and computer programs recorded on one or more computer storage devices, each configured to perform the actions of the methods.

Embodiments of the disclosure may further provide a computer implemented method, comprising receiving, by a first electronic device, a first set of user information from a processing device after a connection is formed between the first electronic device and the processing device, assigning a work area to a user based on the connection formed between the first electronic device and the processing device, generating a notification that the work area is assigned to the user, adjusting one or more characteristics of a first external device coupled to the first electronic device based on the received first set of user information, receiving, by the first electronic device, a second set of user information from the processing device while the connection remains formed between the first electronic device and the processing device; and adjusting one or more characteristics of a second external device coupled to the first electronic device, or the first external device coupled to the first electronic device, based on the received second set of user information.

Embodiments of the disclosure may further provide a computer implemented method, comprising automatically receiving, by a first electronic device, a first set of user information from a processing device after a connection is formed between the first electronic device and the processing device, automatically assigning a work area to a user based on the connection formed between the first electronic device and the processing device, automatically generating a notification that the work area is assigned to the user, adjusting one or more characteristics of a first external device coupled to the first electronic device based on the received first set of user information, receiving, by the first electronic device, a second set of user information from the processing device while the connection remains formed between the first electronic device and the processing device, and automatically adjusting one or more characteristics of a second external device coupled to the first electronic device, or the first external device coupled to the first electronic device, based on the received second set of user information.

Embodiments of the disclosure may further provide a computer implemented method that includes receiving, by a first electronic device, a first set of user information from a processing device after a connection is formed between the first electronic device and the processing device. The method also includes transmitting, by the first electronic device, at least a portion of the first set of user information to a host device. The method also includes receiving, by the first electronic device, authorization information generated by the host device, where the authorization information is generated based on a comparison of the at least a portion of the first set of information and a work area assignment information, where the work area assignment information may include work area reservation information and user identification information. The method also includes generating a notification that the work area is assigned to the user. The method also includes adjusting one or more characteristics of a first external device coupled to the first electronic device based on the received first set of user information. Other embodiments of this aspect include corresponding computer systems, apparatus, and computer programs recorded on one or more computer storage devices, each configured to perform the actions of the methods.

Embodiments of the disclosure may further provide a computer implemented method that includes receiving, by a host device, a request from a user to reserve a work area from a plurality of work areas. The method also includes determining that a work area is available from a list of work areas, which includes information relating to each of the plurality of work areas, where the information may include information relating to an availability of at least one work area of the plurality of work areas. The method also includes assigning the available at least one work area to the user. The method also includes removing the assigned at least one work area from the plurality of work areas. The method also includes generating a notification that the assigned at least one work area is assigned to the user, where generating the notification may include: receiving, by a first electronic device that is configured to be connected between a processing device and the host device, a notification signal from the host device; and delivering a notification signal from the first electronic device to a first peripheral device. Other embodiments of this aspect include corresponding computer systems, apparatus, and computer programs recorded on one or more computer storage devices, each configured to perform the actions of the methods.

Embodiments of the disclosure may further provide a computer implemented method that also includes assigning a work area to a user. The method also includes removing the assigned work area from a listing of a plurality of work areas. The method also includes receiving, by a first electronic device, a first set of user information from a processing device after a connection is formed between the first electronic device and the processing device. The method also includes transmitting the first set of user information to a host device. The method also includes comparing, by the host device, the first set of user information to user identifying information that is stored in a repository. The method also includes determining that the first electronic device is permitted to communicate with the processing device based on the comparison of the first set of user information to the user identifying information. The method also includes receiving, by the first electronic device, authorization information provided from the host device. The method also includes adjusting one or more characteristics of a first external device based on the receipt of the authorization information and the first set of user information. Other embodiments of this aspect include corresponding computer systems, apparatus, and computer programs recorded on one or more computer storage devices, each configured to perform the actions of the methods.

Embodiments of the disclosure may further provide an electronic system. The electronic system also includes a first electronic device, and a non-transitory computer readable medium may include computer-executable instructions that, when executed by a processing system, cause the processing system to perform a method. The method may include receiving, by the first electronic device, a first set of user information from a processing device after a connection is formed between the first electronic device and the processing device. The method also includes authorizing the processing device to communicate with the first electronic device, where authorizing the processing device may include comparing at least a portion of the first set of user information with at least one of user identification data and work area reservation information retrieved from memory. The method also includes automatically assigning a work area to a user based on the connection formed between the first electronic device and the processing device and the authorization of the processing device. The method also includes generating a notification that the work area is assigned to the user; adjusting one or more characteristics of a first external device coupled to the first electronic device based on the received first set of user information; monitoring, by the first electronic device, for a second set of user information from the processing device while the connection is still formed between the first electronic device and the processing device. The method also includes adjusting one or more characteristics of a second external device coupled to the first electronic device, or the first external electronic device coupled to the first electronic device, based on the received second set of user information.

Embodiments of the disclosure may further provide an electronic device for controlling aspects of a desk, and a non-transitory computer readable medium that may include computer-executable instructions that, when executed by a processing system, cause the processing system to perform a method. The method may include receiving, by the first electronic device, a first set of user information from a processing device after a connection is formed between the first electronic device and the processing device. The method also includes authorizing the processing device to communicate with the first electronic device, where authorizing the processing device may include comparing at least a portion of the first set of user information with at least one of user identification data and work area reservation information retrieved from memory. The method also includes automatically assigning a work area to a user based on the connection formed between the first electronic device and the processing device and the authorization of the processing device. The method also includes generating a notification that the work area is assigned to the user. The electronic device also includes a base configured to mount the electronic device, and may include a first plurality of ports, where at least one port of the plurality of ports is configured to receive the information from the processing device. The device also includes a display device connected to the base, and may include a display screen configured to display the notification that the work area is assigned to the user.

The following description and the related drawings set forth in detail certain illustrative features of one or more embodiments.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
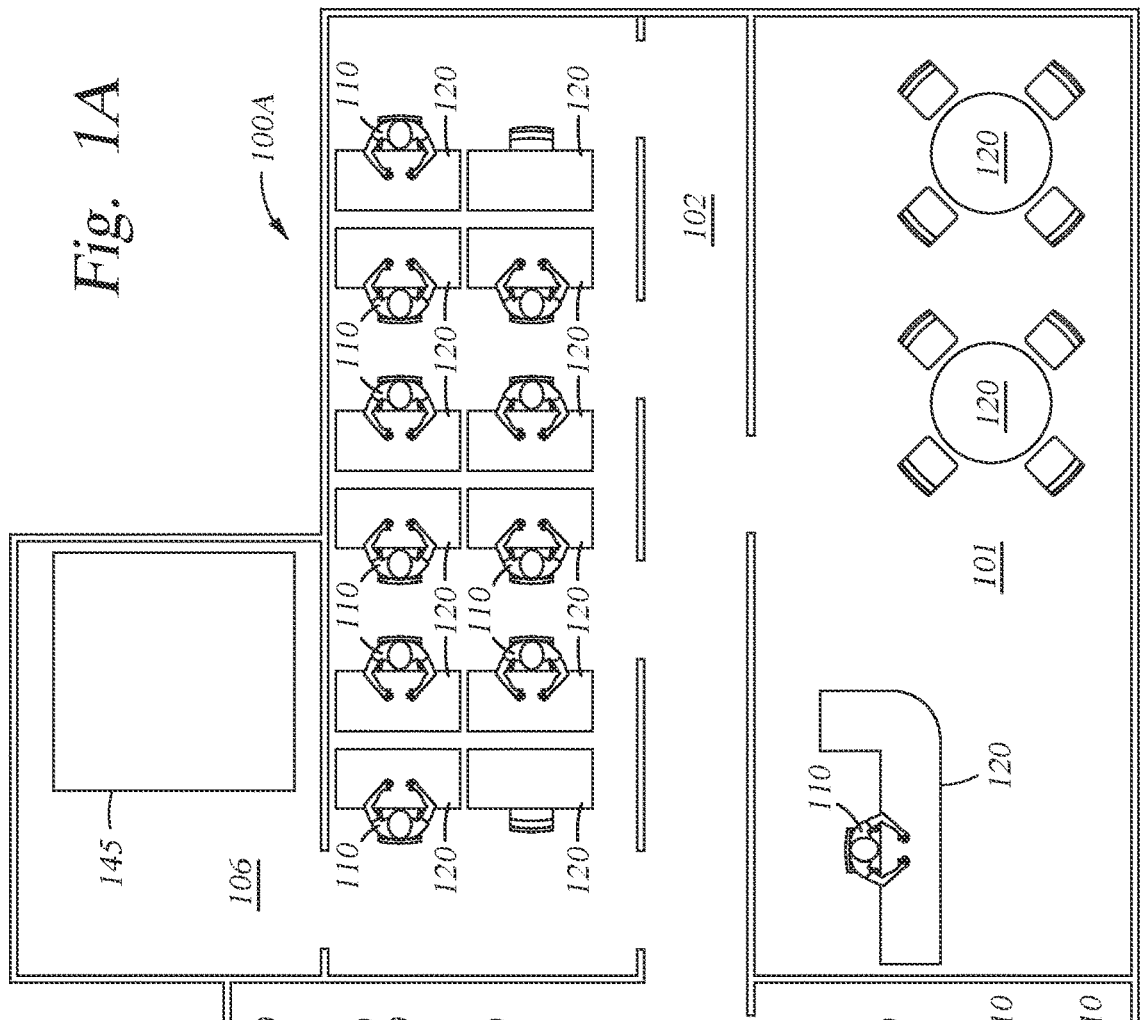
FIG. 1A illustrates a schematic top view of an environment in which humans can interact, according to one embodiment.
Figure 1A:
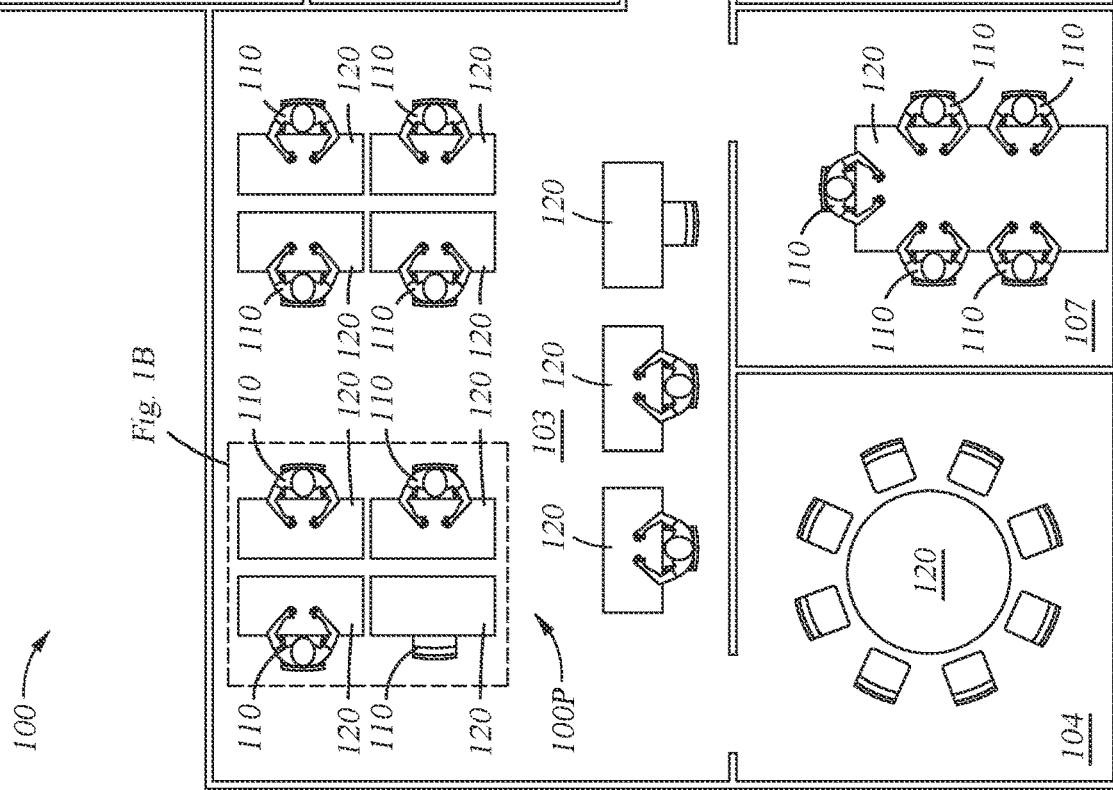

In the following description, numerous specific details are set forth to provide a more thorough understanding of aspects of the present disclosure. However, it will be apparent to one of skill in the art that aspects of the present disclosure may be practiced without one or more of these specific details. In other instances, well-known features have not been described in order to avoid obscuring one or more of the aspects of the present disclosure.

Embodiments herein generally relate to an electronic system and a method of monitoring and providing feedback to adjust and improve the allocation of, use of, and/or control over one or more physical spaces. Embodiments of the disclosure provide an electronic system and method that allows a user to reserve a desk, or work space, in a room or building, such as an office. In some embodiments, the desk can be reserved manually by the user. The methods disclosed herein can include inputting one or more desk preferences into one or more processing devices, receiving, at one or more electronic devices, the desk preferences, determining whether a suitable desk matching the desk preferences is available, and generating an alert on the one or more electronic devices regarding the availability of the suitable desk. In some embodiments, an identity of the user that reserved the work space is published to other users. However, in some embodiments, the work space can be reserved anonymously such that the identity of the user is not published to other users.

An electronic system is disclosed herein that configured to perform one or more of the methods provided below. The term "desk" is used herein to generally describe a "work area" that a user can reserve and occupy for a period of time. Thus, the discussions of a "desk" as used herein can relate to a region of space that can include a desk, a table, a seat, at least a portion of a room, or a space and various related components that provide and/or enable a user to perform a desired activity.

The methods disclosed herein can include one or more processes for reserving desks for various users in an environment, such as an office, educational facility or home. The method and electronic system disclosed herein allow users in the environment to reserve and/or claim an available desk for their immediate use or use at some time in the future. The method and electronic system may also provide solutions to users to reserve a desk that is adapted to suit the need of the user, such as a desk in amongst a desired group of users (e.g., design team), a desk near a window, or a conference room for a meeting. The method and electronic systems disclosed herein allow for creating and monitoring areas within an office or similar space that have varying regions for more effective location of individuals within an office or other type of space. Embodiments described herein can be useful for, but are not limited to, methods and electronic systems used for reserving and controlling the use of a desk in a multiple user environment, such as a work, home or educational environment.

Example Environment for Human Interaction

Figure 1B:
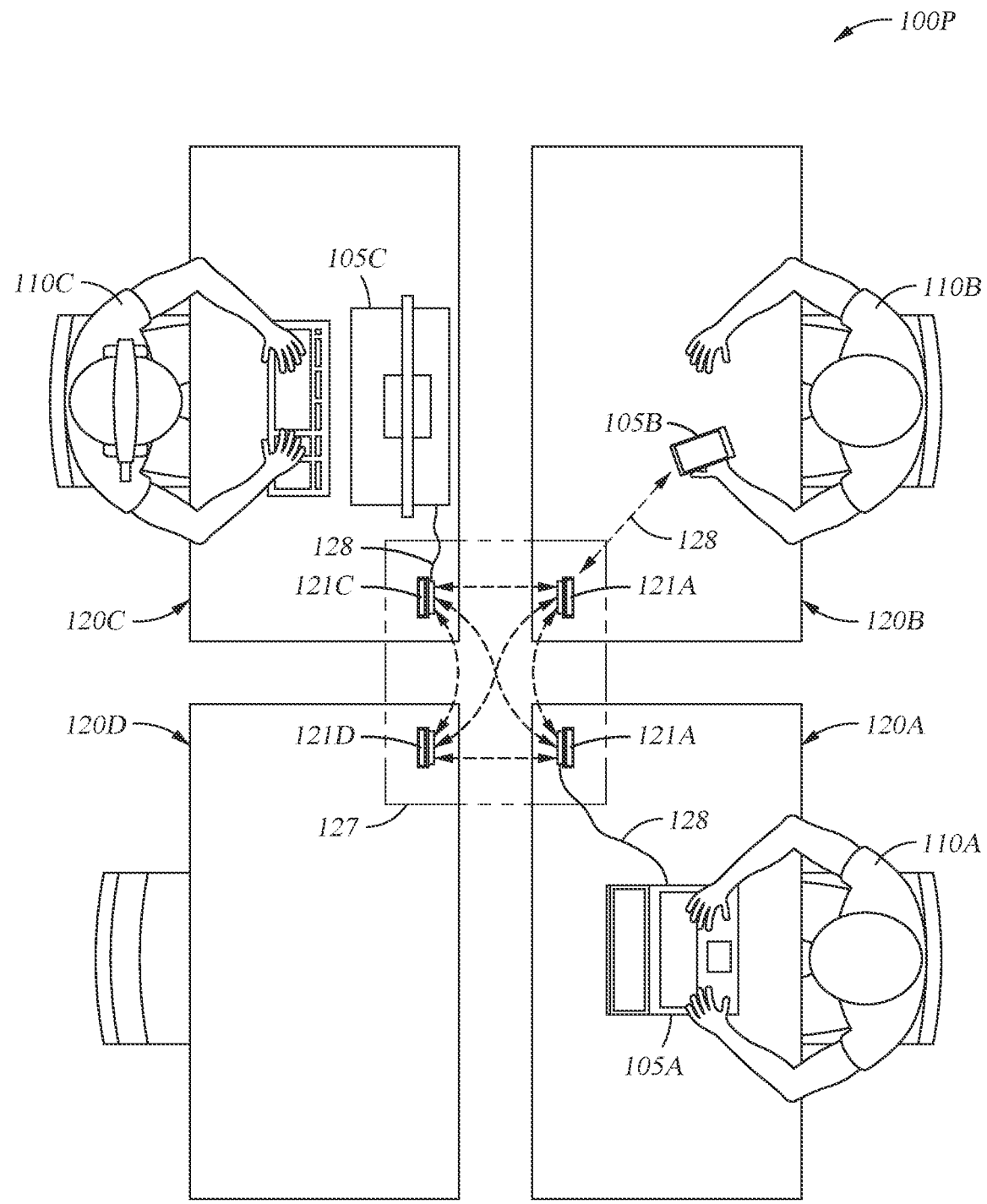
FIG. 1B illustrates a schematic diagram of a portion of the environment from FIG. 1A, according to one embodiment.
Figure 1C:
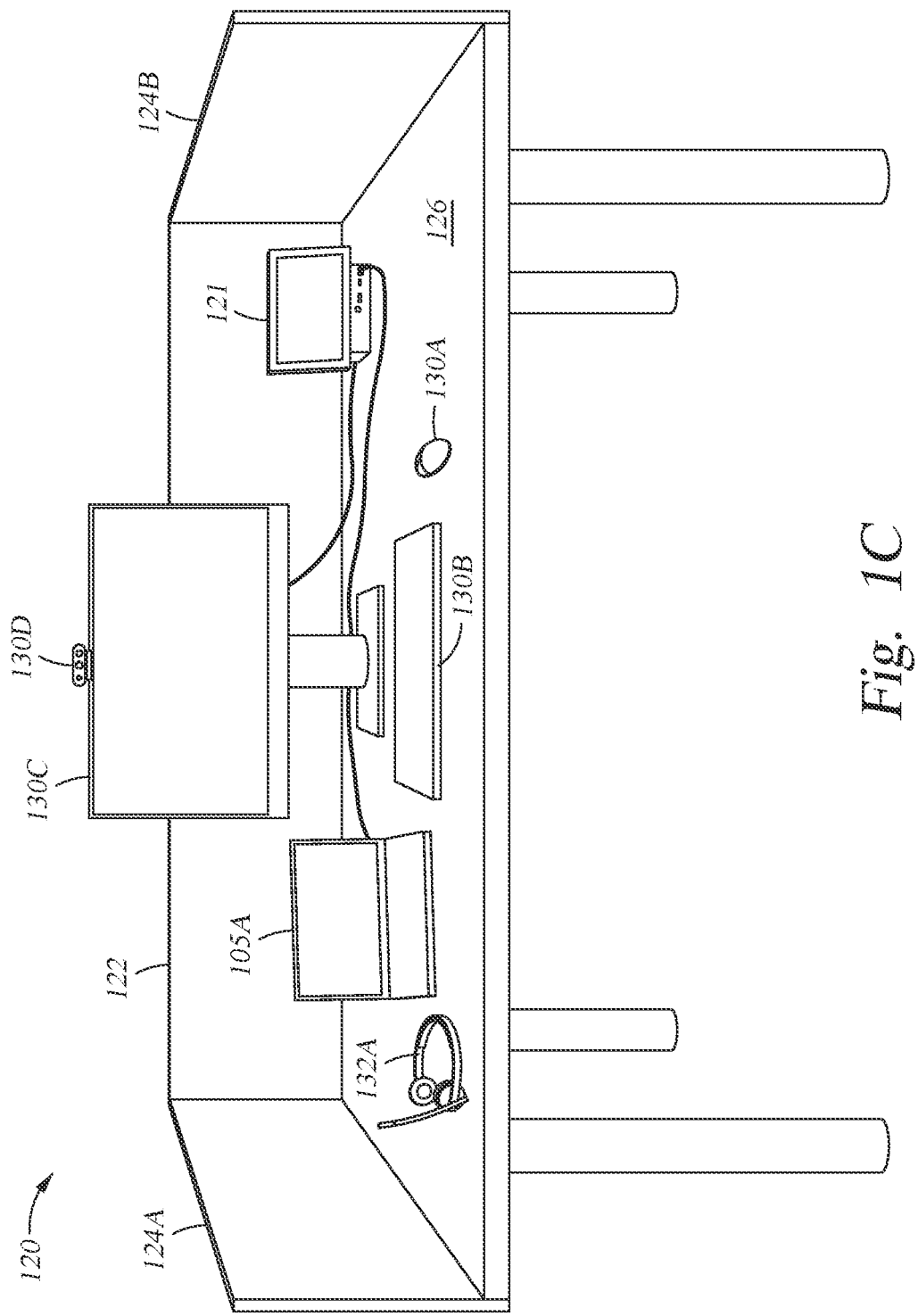
FIG. 1C illustrates a desk from the environment in FIG. 1A, according to one embodiment.

FIGS. 1A-1D illustrate one or more examples of how an electronic system (e.g., an electronic system 200 in FIG. 2A) is used to manage a plurality of desks 120. In general, an electronic system 200 will include a plurality of electronic devices (e.g. an electronic device 121 in FIGS. 1C-1D) and supporting equipment that are interconnected and distributed at desired locations within an environment. The supporting equipment can include one or more servers, networking equipment and associated software, computers, internet connected appliances and other useful devices that are adapted to facilitate one or more methods or apparatus disclosed herein. In this example, a user 110 uses the electronic device to connect to and/or claim a desk 120 of a plurality of available desks 120. During normal use, a user 110 may enter an environment 100 (e.g., an office) where desk 120 is located and travel to a desired desk 120. In this example, the desired desk 120 is located in a portion 100P of environment 100 such as a room or portion of a room. Referring to FIGS. 1B-1C, the desired desk 120 includes an electronic device 121 and several peripheral devices 130 (e.g., a mouse 130A, a keyboard 130B, a computer monitor 130C) which connect to electronic device 121. Peripheral devices 130 may be accessory devices for a processing device 105 or an electronic device 121 that are provided for user 110. Thus, peripheral devices 130 are separate and distinct devices from electronic device 121. In some embodiments, the peripheral devices 130 can be provided for user 110 to use by a manager of an environment 100, such as an information technology (IT) or facilities and/or building manager. In this case, the peripherals will generally remain at the desk when user 110 stops using the desk 120 after a period of time. As part of this process user 110 connects to and/or claims desk 121 by connecting the processing device 105 to electronic device 121. Processing device 105 may be an electronic device (e.g., a laptop 105A, a tablet 105B) used to process information and/or run one or more software applications. Desk 120 is then effectively removed from the plurality of available desks 120 found within the environment 100, and the notifications and physical constraints that are created when a user 110 connects up to a desk 120 is described in further detail below.

FIG. 1A illustrates a schematic top view of environment 100 in which humans can interact, according to one embodiment. Environment 100 can be an open office, home, or educational environment. For the purpose of explanation of various embodiments of the disclosure, environment 100 can include a plurality of rooms 100A that may include one or more of a reception room 101, a first employee work room 102, a second employee work room 103, a first conference room 104, a second conference room 107, and a host device room 106. Although environment 100 as shown includes rooms 101, 102, 103, 104, 106, 107, it is to be understood that the number of rooms is purely illustrative, and any number of rooms and types of rooms could be contained within environment 100.

Each room of plurality of rooms 100A generally has one or more users 110 included there within, although at any given time one or more rooms 100A can be empty. In addition, the number of users 110 in a given room 100A can fluctuate over time. Thus, each of rooms 100A can include one or more electronic devices 121 (e.g., electronic devices 121A, 121B, 121C, and 121D in FIG. 1B) that are part of an electronic system. The one or more electronic devices 121 may be positioned in various locations of rooms 100A (e.g., electronic device 121 is mounted on a wall of a room, on a desk 120 in a room, on a table in a room, etc.).

Plurality of rooms 100A optionally includes host device room 106, and host device 145 of electronic system 200 that is located therein. Host device 145 can facilitate communication between various devices (e.g., electronic devices 121, peripheral devices 130) disposed in environment 100 and/or provide storage for various types of data and other digital information. In some embodiments, host device 145 is located offsite and/or at a remote location and host device room 106 is not included.

FIG. 1B is a schematic diagram of portion 100P of environment 100, according to one embodiment. As shown, a plurality of users 110 are positioned within portion 100P of environment 100, such as a room or portion of a room. In this example, each user 110 (e.g., users 110A, 110B, and 110C) is associated with an electronic device 121 (e.g., electronic devices 121A, 121B, and 121C).

In some embodiments, electronic devices 121 are each configured to monitor, receive information about, share information about and/or process information regarding the availability of desks 120 (e.g., desks 120A, 120B, 120C, and 120D) and meeting rooms (e.g., meeting rooms 104 and 107) within at least a portion of the environment 100. As shown, electronic device 121 connects to a processing device 105 (e.g., processing devices 105A, 105B, and 105C). In certain embodiments, electronic device 121 is a device for interfacing the processing device 105 with electronic system 200. Electronic device 121 may augment a processing device 105 and is used to facilitate management of hotel desks.

Figure 2A:
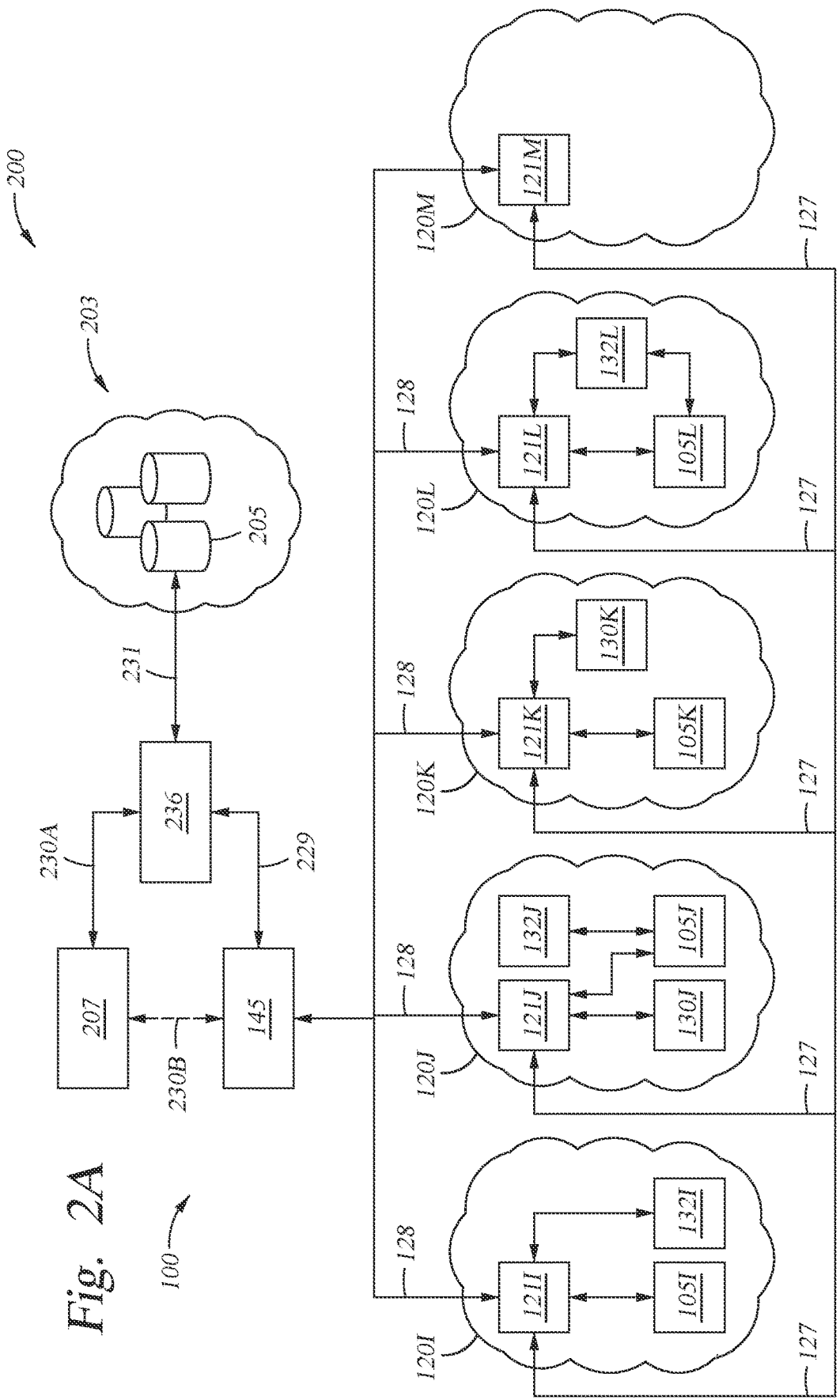
FIG. 2A is a schematic representation of the electronic system in FIGS. 1A-1D, according to one embodiment.

As shown in FIGS. 1B and 2A, electronic device 121 is configured to receive and transmit data received from one or more elements within the electronic system 200 and/or host device 145 to the processing device 105 via a communication link 128. Communication link 128 can be a wired or wireless communication link. Processing device 105 is configured to receive and process the data transmitted from electronic device 121. In some embodiments, electronic device 121 includes a controller 250 that includes a processor, memory and an I/O device as discussed in FIG. 2B. In another embodiment, electronic device 121 is integrated into another device such as a peripheral 130 (e.g., a computer monitor) or a processing device 105 (e.g., a laptop), but is still a separate and distinct component from other components within the peripheral 130 or processing device 105.

Processing device 105 may connect to electronic device 121 using a cable, such as a USB-C cable, or wirelessly, such as through Bluetooth® or Wi-Fi. In one example, as shown in FIG. 1B, processing device 105 is a laptop 105A, and electronic device 121A includes a processor that is configured to communicate with the laptop by a universal serial bus (USB) cord or cable, which forms at least part of communications link 128. In another example, processing device 105B is a smartphone, and electronic device 121B includes a processor that communicates to the smartphone by a Bluetooth® or Wi-Fi communication link 128. In yet another example, processing device 105C is a desktop computer, and electronic device 121C includes a processor that communicates to the desktop computer by an Ethernet communications link 128.

In certain embodiments, processing device 105 refers to a technological device for receiving, storing, processing and transmitting data. Processing devices 105 may be selected from several different types of devices, such as a cell phone (e.g., smartphone), a smart watch, a pair of smart glasses, an augmented reality (AR) headset, a virtual reality (VR) headset, a tablet computing device, laptop computer, a desktop computer, or other similar electronic device. In some embodiments, the electronic device 121 may be integrated within an electronic device, such as, but not limited to, an iPod® media player, iPhone® smartphone, iPad® tablet, Android™ phone, Samsung phone, Samsung Galaxy® smartphone, Apple Watch, Samsung Galaxy Watch, Microsoft Surface® tablet, laptop, desktop computer, all-in-one computer, or other similar device.

In certain embodiments, host device 145 is a device that communicates with the electronic devices to determine and coordinate an availability of and scheduling reservations of desks. The host device 145 may include a router, a server, an Ethernet switch, a controller, a processer, a memory, and software to implement, manage, and maintain electronic system 200 including the desk reservation and control of one or more components within the electronic system 200. In some embodiments, the memory within the host device 145 includes one or more algorithms that are configured receive a desk reservation request from an external device, compare the request with a list of reservations stored in memory, update list of reservations when the requested reservation does not conflict with a reservation saved within the stored list, and cause the transmission of work area assignment information (e.g., reservation time and day, user information, reservation duration, etc.) relating to the reservation to an electronic device 121 so that reservation can be carried-out, by software running on the electronic device 121, at the time it was requested. In some embodiments, the list of reservations stored in memory includes information relating to the availability of each of the plurality of desks 120 within the electronic system 200, information relating to the time and the day of the reservation of each of the plurality of desks 120, user information relating to each reservation, the time duration of each reservation in the list, and/or other useful information relating to the reservation.

In certain embodiments, one of electronic devices 121 is configured to communicate with other electronic devices 121 located in environment 100 via the one or more communication links 127 (e.g., electronic device 121A communicates with electronic devices 121B and 120C). For example, an electronic device 121 in first conference room 104 displays a message on electronic device 121 at desk 120 alerting user 110 that a meeting in conference room 104 is running late. Communication link 127, and also communication link 128, can each include a wired and/or wireless communication path that is enabled by the transmission of a communication signal, such as the transmission of a radio signal, infrared signal, ultrasonic signal, electronic signal, or other similar communication signal transfer method, according to some embodiments. Other communication signal transfer methods that can be used include, but are not limited to, wireless communication technologies, such as Bluetooth® wireless technology (BT), Bluetooth® Low Energy wireless technology (BLTE), Infrastructure Wireless Fidelity (Wi-Fi™) wireless technology, soft access point (AP), Wi-Fi-Direct, near-field communication (NFC), and any combination of the above. As discussed FIG. 2B, electronic devices 121 will also generally include software applications that include software applications that are stored in a memory and are configured to receive, analyze and/or transmit the information transferred via a communication link 127. The software applications are generally used by one or more of electronic devices 121 to perform some part of the various methods described herein.

In certain embodiments, processing devices 105 include software applications stored in a memory and configured to receive, analyze and/or transmit the information transferred via a communication link 128. The software applications are generally used by one or more of processing devices 105 to perform some part of the various methods described herein.

FIG. 1C illustrates a desk 120 from environment 100 in FIG. 1A, according to one embodiment. In this embodiment, desk 120 has a rear wall 122, a left divider 124A, a right divider 124B, and a chair (not shown). Electronic device 121 rests on a top surface 126 of desk 120. In some embodiments, electronic device 121 may be mounted to surface of the desk 120 by a magnetic table mount, a screw top table mount, or may mount to rear wall 122 or dividers 124A and 124B by a wall mount. Electronic device 121 is coupled to a power source (not shown).

Various peripheral devices 130 may connect to electronic device 121, such that the electronic device 121 acts as an intermediary between a processing device 105 (e.g., laptop 105A in FIG. 1C) and other parts of electronic system 200 and components connected to electronic system 200 (e.g., internet, remote users, servers, etc.). In one example, a mouse 130A, a keyboard 130B, a computer monitor 130C, and a webcam 130D are in data communication with electronic device 121. Connecting processing device 105 to electronic device 121 also connects peripheral devices 130 to processing device 105. For example, user 110 interacts with and uses one or more of the peripheral devices 130 while laptop 105A is connected to electronic device 121. For example, user 110 may use computer monitor 130C as a display, keyboard 130B, and mouse 130A that are configured to transmit data to and/or receive data from the laptop 105A. In certain embodiments, laptop 105A couples to the power source through electronic device 121. The provided peripheral devices 130 and power source allows user 110 to provide only laptop 105A when using desk 120, which beneficially reduces the items user 110 must carry. Thus, electronic device 121 acts as a hub, gateway, or interface between processing device 105 and peripheral devices 130. In other embodiments, electronic device 121 includes an internet source, a Wi-Fi node, or a Wi-Fi extender or repeater.

Peripheral devices 130 may be secured to electronic device 121 such that user 110 cannot disconnect them from electronic device 121. Peripherals may connect to electronic device 121 using a wired or wireless connection. In other embodiments, different and/or additional peripheral devices 130 are used.

In some embodiments, each desk 120 in environment 100 may use the same type of peripheral devices 130 to beneficially ensure a common experience for user 110. In other embodiments, different configurations of peripheral devices 130 may be used for different types of users 110 and/or rooms (e.g., rooms 101, 102, 103, 104, 106, and/or 107 in FIG. 1A). For example, users as part of a design team may use a three-dimensional (3D) mouse, an additional computer monitor, and/or a drawing tablet, users as part of a multimedia team may use an audio mixer, users as part of a security team may use identification card printers or fingerprint scanners, and users as part of a scientist and engineering team may use various test equipment such as load frames, microscopes, and/or chemical analyzers. In some embodiments, peripheral 130 configuration is managed by an information technology (IT) team or department.

In this embodiment, user 110 can connect various user devices 132 to electronic device 121. A user device 132 may be an accessory device provided by user 110 for use with processing device 105 or an electronic device 121. In some embodiments, user devices 132 are the same accessory device as peripheral devices 130, but instead are provided by user 110. For example, user 110 can connect a headset 132A to electronic device 121. In other embodiments, such as discussed in FIG. 1D, different and/or additional user devices 132 are used. In some embodiments, user devices 132 include processing devices 105 (e.g., smartphone) and/or peripheral devices 130 provided by user 110. For example, user 110 may prefer to use their own keyboard or provide an additional computer monitor.

In certain embodiments, user devices 132 include various technological devices and accessories, such as devices substantially similar to peripheral devices 130 and processing devices 105, provided by a user 110. User devices 132 may connect to electronic device 121 or processing device 105 using a wired or wireless connection. In some embodiments, user devices 132 include an external microphone, an external camera (e.g., webcam, video camera), headphones, wireless charging station, USB thumb drive, display, and/or smart glasses. User devices 132 may further include peripherals that user 110 provides, such as a user-provided keyboard or mouse.

In general, an external device, as the term is used herein, is a device that is disposed within the electronic system 200 that is in electrical communication with an electronic device 121 that is performing or is used to perform one or more of the methods described herein. In some embodiments, an external device is directly associated with an electronic device 121 that is positioned at a desk 120, such as the processing device 105, one or more peripheral devices 130, or one or more user devices 132.

As previously discussed, user 110 may connect processing device 105 to electronic device 121 to claim desk 120. In other embodiments, user 110 may reserve a desk 120 in advance as discussed in FIG. 4. In some embodiments, the electronic device 121 automatically receives a notification of a reservation of a desk 120 based on a prior entered or received reservation coming due on a calendar or scheduling software application running on an electronic device (e.g., processing device 105 or host device 145). In other embodiments, electronic system 200 may automatically assign a desk 120 to user 110 based on criteria entered by and/or associated with user 110 (e.g., a time period, a user preference on desk location).

Electronic Device(s) for Managing Environments

Figure 1D:
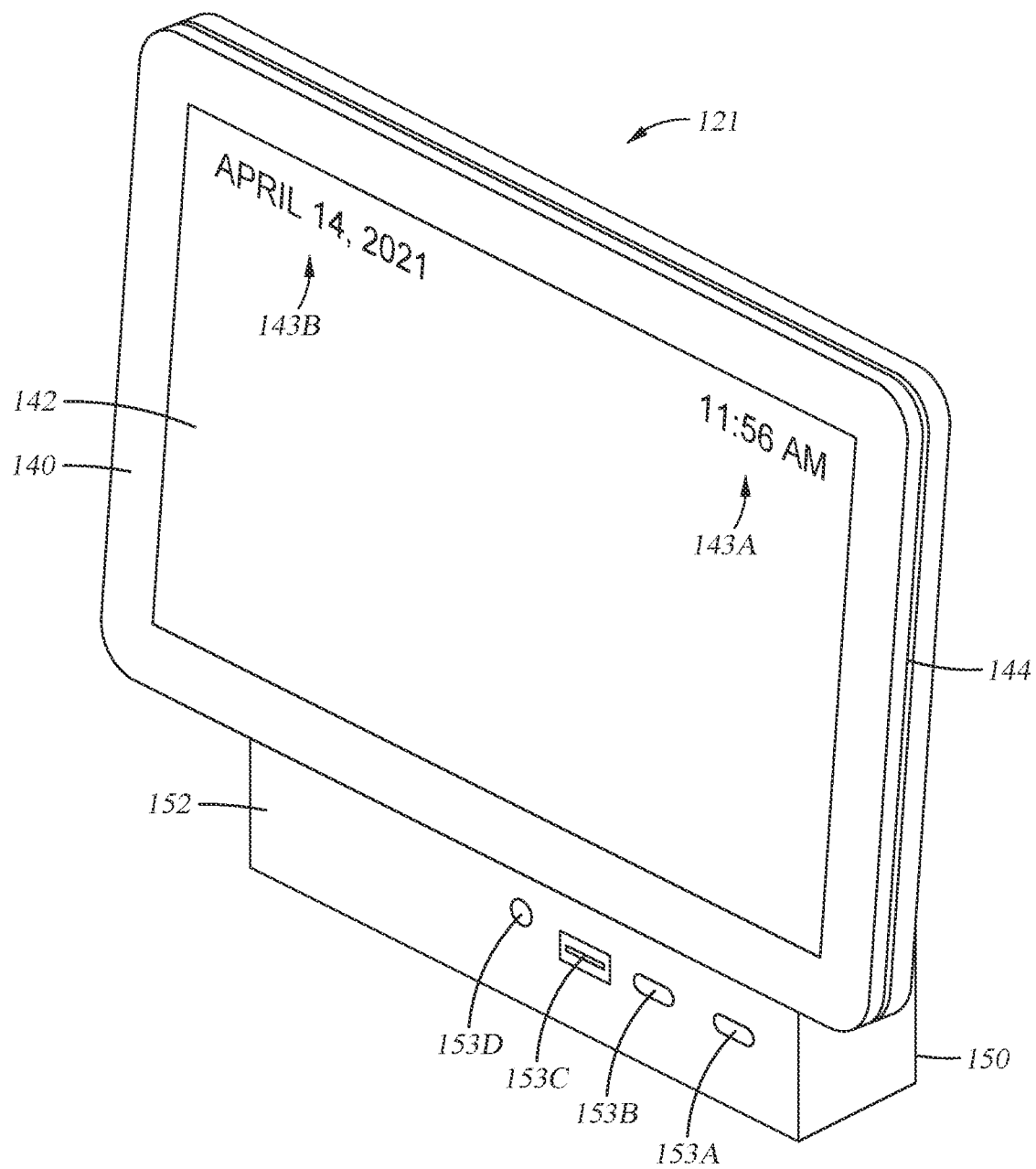
FIG. 1D illustrates an isometric front view of an electronic device illustrated in FIG. 1C, according to one embodiment.

FIG. 1D illustrates an isometric front view of electronic device 121 from FIG. 1C, according to one embodiment. In this embodiment, electronic device 121 includes a display panel 140 and a base 150. Display panel 140 includes a display screen 142 to display information to user 110. For example, display screen 142 is located on a front of electronic device 121 and displays a time 143A, a date 143B, or other information as discussed later in FIGS. 3A-3D.

Display panel 140 (FIG. 1D) further includes an indicator light 144 which may be used to indicate the availability and/or status of desk 120. In one configuration, as shown in FIG. 1D, the indicator light 144 includes a "light bar" that is configured to be visible from multiple angles and/or sides of the electronic device 120. In one example, if desk 120 is available, indicator light 144 is green. If desk 120 is reserved, in use, or otherwise unavailable, indicator light 144 is red. This beneficially alerts other users 110 to the status of desk 120 while requiring minimal power. In some embodiments, the indicator light 144 includes an LED light that is located on a portion of display panel 140 or on a side of electronic device 121. In other embodiments, the availability and/or status of desk 120 is displayed on display screen 142, either in addition to or instead of indicator light 144. For example, display screen 142 may display as green to indicate the desk is available or show a message indicating the user 110 is away from desk 120 but will be back shortly. For example, display screen 142 may display a name or other identifying information of a user 110 that has claimed or reserved desk 120. This beneficially allows others to know what user 110 is at the desk 120 when the user 110 is away from the desk 120.

Base 150 includes an interface panel 152 on the front side of electronic device 121. Interface panel 152 includes various outlets, jacks, and ports 153 that user 110 interacts with to connect various user devices 132 and/or processing devices 105. In this embodiment, interface panel 152 includes USB-C ports 153A and 153B, USB-A port 153C, and a 3.5 mm audio jack 153D. USB-C ports 153A and 153B are used to connect processing device 105 to electronic device 121 and further connect processing device 105 to peripherals as discussed in FIG. 1C. USB-C ports 153A and 153B are further used to charge and/or exchange data with user device 132. USB-A port 153C is used in a substantially similar manner to USB-C ports 153A and 153B. Audio jack 153D is used to connect certain user devices 132 such as headphones, speakers, microphones, and the like. The terms outlets, jacks, slots, and ports are used interchangeably herein unless otherwise noted. Although examples are provided discussing the function of ports 153, they are not meant to be limiting as other uses are possible.

In this embodiment, display screen 142 is a touch screen, but may not be in other embodiments. Display screen 142 may include any of the following functions. Display screen indicates whether desk 120 is available, reserved, or in use. Display screen 142 indicates a current status of user 110, such as whether the user is at lunch. Display screen 142 syncs with a calendar of user 110 and displays reminders of user's 110 upcoming events and/or meetings. Display screen 142 provides an interface for user 110 to join a virtual meeting. For example, display screen 142 shows a team meeting is about to start and provides selectable options to user 110 such as join meeting, running late, or ignore meeting. In such an example, electronic device 121 interfaces with meeting platforms such as Microsoft Teams, Zoom, Google Meet, GoToMeeting™, WebEx™, and 8×8® through processing device 105. For example, electronic device 121 uses processing device 105 as an agent to pass commands (e.g., join meeting) through to the meeting platforms which reside on processing device 105. In such an example, electronic device 121 communicates with a software application running on processing device 105, such as described in FIG. 1D, to carry out the desired command. Executed commands may include opening a meeting platform, transferring information on a meeting such as a meeting ID and/or conference room ID, and joining the meeting. Thus, the software application may need elevated permissions when installed or when acting to access and control the meeting platform on processing device 105. The selectable options provide a one touch approach for a user 110 to address the meeting reminder regardless of the meeting platform, which beneficially allows user 110 to easily join a meeting without looking up additional details such as a meeting hyperlink or call-in information. In other embodiments, processing device 105 displays substantially similar meeting details and options through software on processing device and/or a web interface.

In other embodiments, interface panel 152 may include additional or alternative ports. For example, ports such as an Ethernet, HDMI, VGA, DisplayPort, DVI, optical audio, RCA, USB-A, AC electrical outlet, external memory card reader, serial, and the like may be used.

Figure 1E:
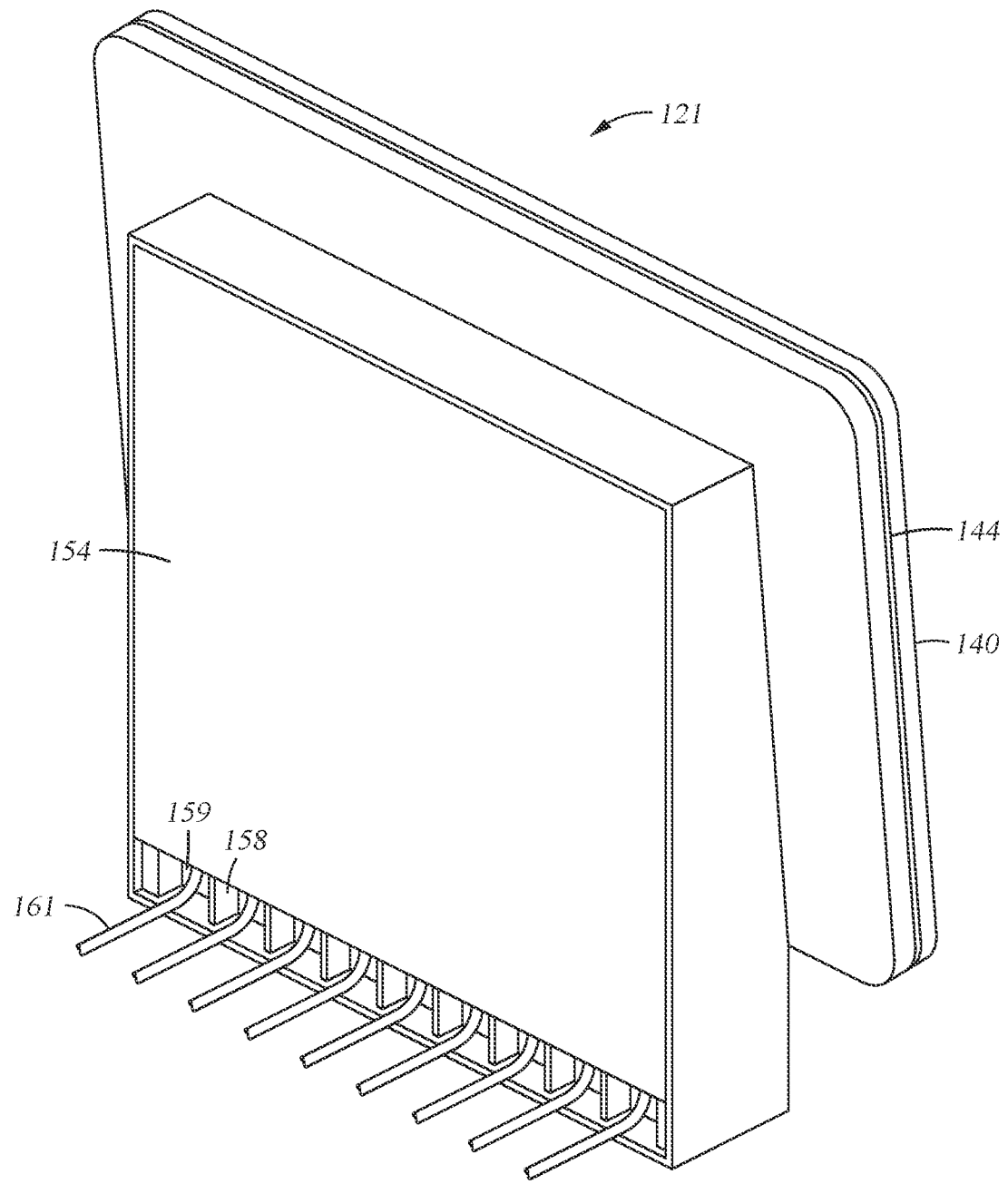
FIGS. 1E-1F illustrate an isometric back view of the electronic device illustrated in FIG. 1D.
Figure 1F:
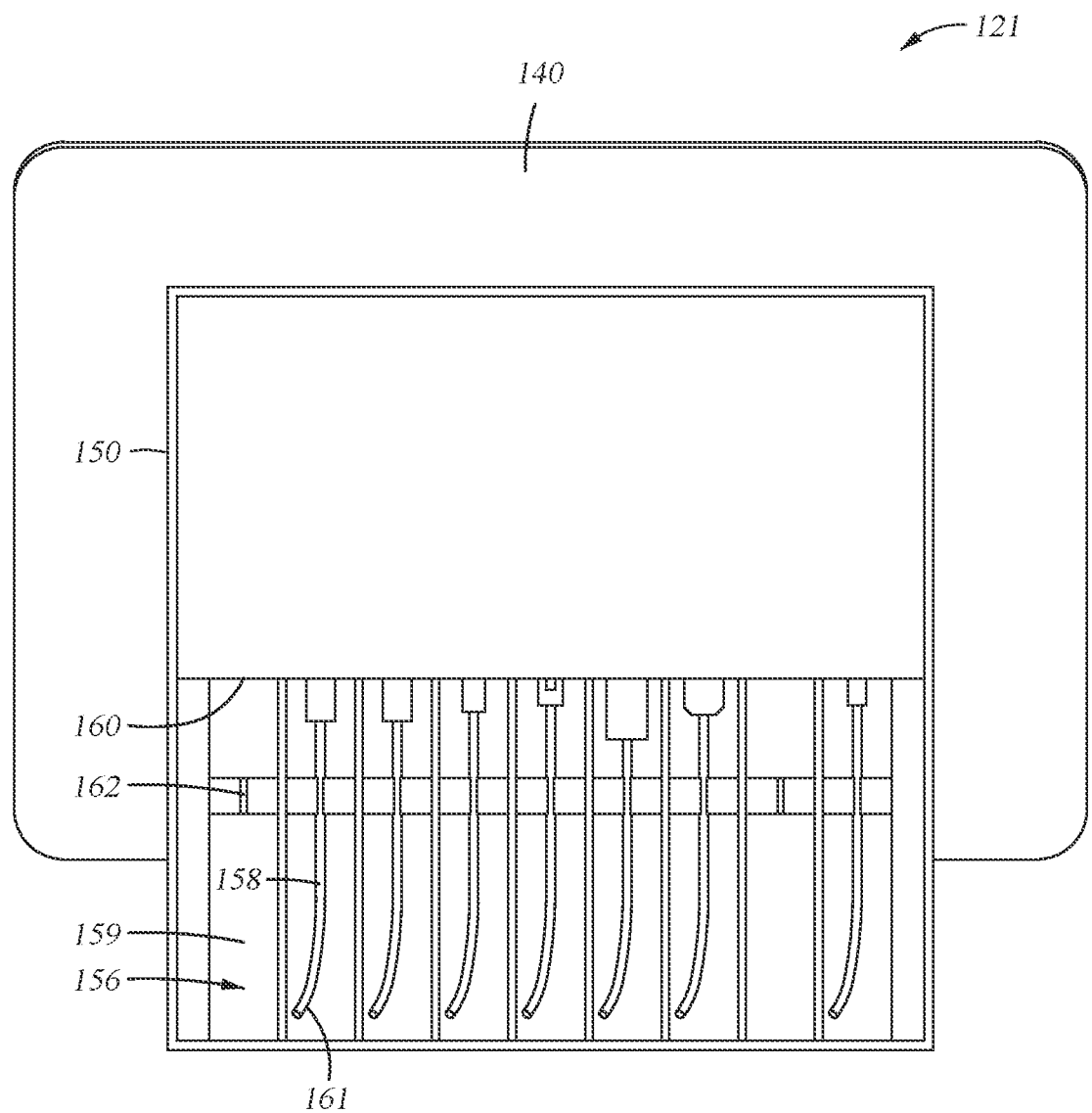

FIGS. 1E-1F illustrate an isometric rear view and a schematic rear view of electronic device 121 from FIG. 1C, according to one embodiment. In this embodiment, base 150 includes a removable panel 154 that is removable only by authorized personnel such as IT or facilities managers as further discussed in FIGS. 6A and 6B. In certain embodiments, removable panel 154 covers a volume 156 of space that is used for connecting and housing different cables 161. Volume 156 may contain several dividers 158 that segment volume 156 into different slots 159 and/or channels to aid management of the cables 161.

In this embodiment, base 150 includes a connection panel 160, which includes various ports to connect peripheral devices 130, processing devices 105, and/or user devices 132 and the like. In certain embodiments, connection panel 160 contains ports similar to those of a type previously discussed for the interface panel 152 in FIG. 1D, where at least one of the USB ports may be an upstream port. In certain embodiments, connection panel 160 is disposed inside volume 156 and is not visible when removable panel 154 is installed.

In one example, peripheral devices 130 have cables 161 that travel into volume 156. Each cable 161 travels through a gap formed between removable panel 154 and base 150, between dividers 158, through a slot 159, and connects to connection panel 160. A cable clip 162 is disposed in slot 159 and holds cable 161 in place by holding and/or conforming to an outer diameter of cable 161 and securing cable 161 to base 150. In certain embodiments, cable clip 162 and removable panel 154 prevent user 110 from accessing connection panel 160 and cables 161. In one example, cable clip 162 is near connection panel 160 and beneficially ensures cable 161 cannot be disconnected from connection panel 160. For example, cable clip 162 snugs against a connector of cable 162 such that when cable 161 is pulled away from connection panel 160, the cable clip 162 exerts a force on the connector and prevents the connector from disconnecting from connection panel 160. In other embodiments, cable clip 162 tightens a grip on cable 161 when cable 161 is pulled in a direction.

In other embodiments, the ports on connection panel 160 are not accessible when removable panel 154 is installed. For example, removable panel 154 may include a security mechanism such as a lock, special fasteners such as a triangle head screw, Torx® tamper-resistant or tamper-proof screws, and Trident™ tamper-resistant screws and nuts, and/or hidden clips and the like to secure removable panel 154 and restrict access to connection panel 160. This prevents user 110 from disconnecting peripheral devices 130 and the like, which beneficially prevents theft and ensures desk 120 is configured as intended (e.g., with the intended peripheral devices 130). Removable panel 154 further prevents user 110 from connecting unauthorized user devices 132 and the like to electronic device 121. In other embodiments, a port on connection panel 160, such as a USB-C port, is used to connect processing device 105 to electronic device 121, which beneficially prevents the need for user 110 to supply a USB-C cable.

In other embodiments, electronic device 121 identifies and tracks all peripheral devices 130 and the like that are connected to its ports. During normal use the software within the electronic device 121 may regularly communicate with the various components or run diagnostic algorithms to ascertain the relative health and ability of the peripheral devices 130 to perform their desired function. This beneficially allows electronic system 200 to automatically track what peripheral devices 130 are available at each desk 120 without additional setup or manual entry. In certain embodiments, electronic system 200 determines a status of one or more peripheral devices 130 at each desk 120. For example, electronic system 200 tracks if any peripheral devices 130 are broken, malfunctioning, disconnected or removed. Information on peripheral devices 130 and the like may be presented in a graphical user interface (GUI), such as the GUI 600A in FIG. 6A. In other embodiments, removable panel 154 is accessible to authorized personnel, such as IT and facilities managers, for peripheral 130 setup and maintenance.

FIG. 2A is a schematic representation of electronic system 200 illustrated in FIGS. 1A-1D, according to one embodiment. Electronic system 200 includes various electrical components that are distributed within the environment 100, and will include electronic devices 121, which are each typically associated with a desk 120 (e.g., desks 120I, 120J, 120K, 120L, and 120M) as previously discussed. In some embodiments, the electronic system 200 may also include a repository 205, which is used by electronic system 200 to store and access data. Electronic system 200 can connect to a monitoring device 207 and an Internet environment 203 through an Internet-connected router 236. In other embodiments, router 236 connects to Internet environment 203 through a communications link 231. In other embodiments, monitoring device 207 and Internet environment 203 are considered part of electronic system 200. In other embodiments, electronic devices 121 and/or monitoring device 207 interface through a cloud-based environment instead of through host device 145, Internet environment 203, repository 205, and router 236.

The components associated with the desks 120 communicate with electronic system 200 though electronic devices 121. Thus, electronic devices 121 are an interface for electronic system 200. In this embodiment, electronic devices 121 may communicate with each other, either directly or through the electronic system 200, using communications link 127 and electronic devices 121 communicate with host device 145 through communications link 128.

One or more of monitoring device 207 may be used to monitor aspects of the electronic system 200. For example, an IT or facilities manager may use the monitoring device 207 to monitor a health of electronic system 200 and connected devices or desk usage as described in FIGS. 6A and 6B. In some embodiments, the monitoring device 207 includes an electronic device, such as a tablet computing device, laptop computer, a desktop computer, or other similar electronic device. Monitoring device 207 may connect to electronic system 200 through router 236 and/or host device 145 using a communications link 230. In one embodiment, monitoring device 207 connects to router 236 through communications link 230A. In other embodiments, monitoring device 207 connects to host device 145 through communications link 230B. In other embodiments, host device 145 connects to router 236 through a communications link 229. Communication links 229, 230, and 231 are substantially similar to communication links 127 and 128 as described in FIG. 1B, and can each include a wired and/or wireless communication path that is enabled by the transmission of a communication signal.

Host device 145 may communicate with electronic devices 121, for example by receiving a status of desks 120 (e.g., occupied, available), information on connected devices (e.g., peripheral devices 130, processing devices 105), and/or other data (e.g., network quality, history of desk usage, health of connected devices) from the electronic devices 121. The host device 145 is configured to communicate with one or more of electronic devices 121 by use of wired, wireless, or a combination thereof signal transfer methods using one or more communication links 128. Additionally, host device 145 can determine and transmit the most appropriate data from electronic devices 121 to monitoring device 207 via a communication link. Although host device 145 is shown in environment 100, in some embodiments, host device 145 can be located elsewhere, such as in Internet environment 203. In other embodiments, host device 145 is not used and electronic devices 121 connect to monitoring device 207 and router 236 directly.

Desks 120 illustrate example configurations of devices 105, 121, 130, and 132. For example, at desk 120I a processing device 105I and user devices 132I each connect to an electronic device 121I and electronic device 121I acts as an interface to connect user devices 132I to processing device 105I. In one example, a user device 132I (e.g., a USB thumb drive or memory card) connects to electronic device 121I and is accessed by processing device 105I through electronic device 121I. For example, at desk 120J peripheral devices 130J and a processing device 105J each connect to an electronic device 121J. User devices 132J connect to processing device 105J and may be accessed by electronic device 121J through processing device 105J. In one example, a peripheral 130J (e.g., a keyboard) controls a user device 132J (e.g., a volume of headphones) which is connected to processing device 105J (e.g., processing device 105J streams music to headphones). For example, at desk 120K a processing device 105K and peripheral devices 130K each connect to an electronic device 121K and electronic device 121K acts as an interface to connect user peripheral devices 130K to processing device 105K. For example, at desk 120L a processing device 105L and a user device 132L each connect to an electronic device 121L and user device 132L further connects to processing device 105L. In one example, user device 132L is a cloud-based environment interface, such as a Wi-Fi hotspot, and both electronic device 121L and processing device 105L connect to the cloud-based environment interface. For example, at desk 120M an electronic device 121M is available for a user to reserve and/or claim by connecting a device (e.g., a processing device). In one example, as discussed in FIG. 1C, user 110 (not shown) connects processing device 105 (not shown) to electronic device 121M to claim desk 120M.

Controller for Electronic Device for Managing Environments

Figure 2B:
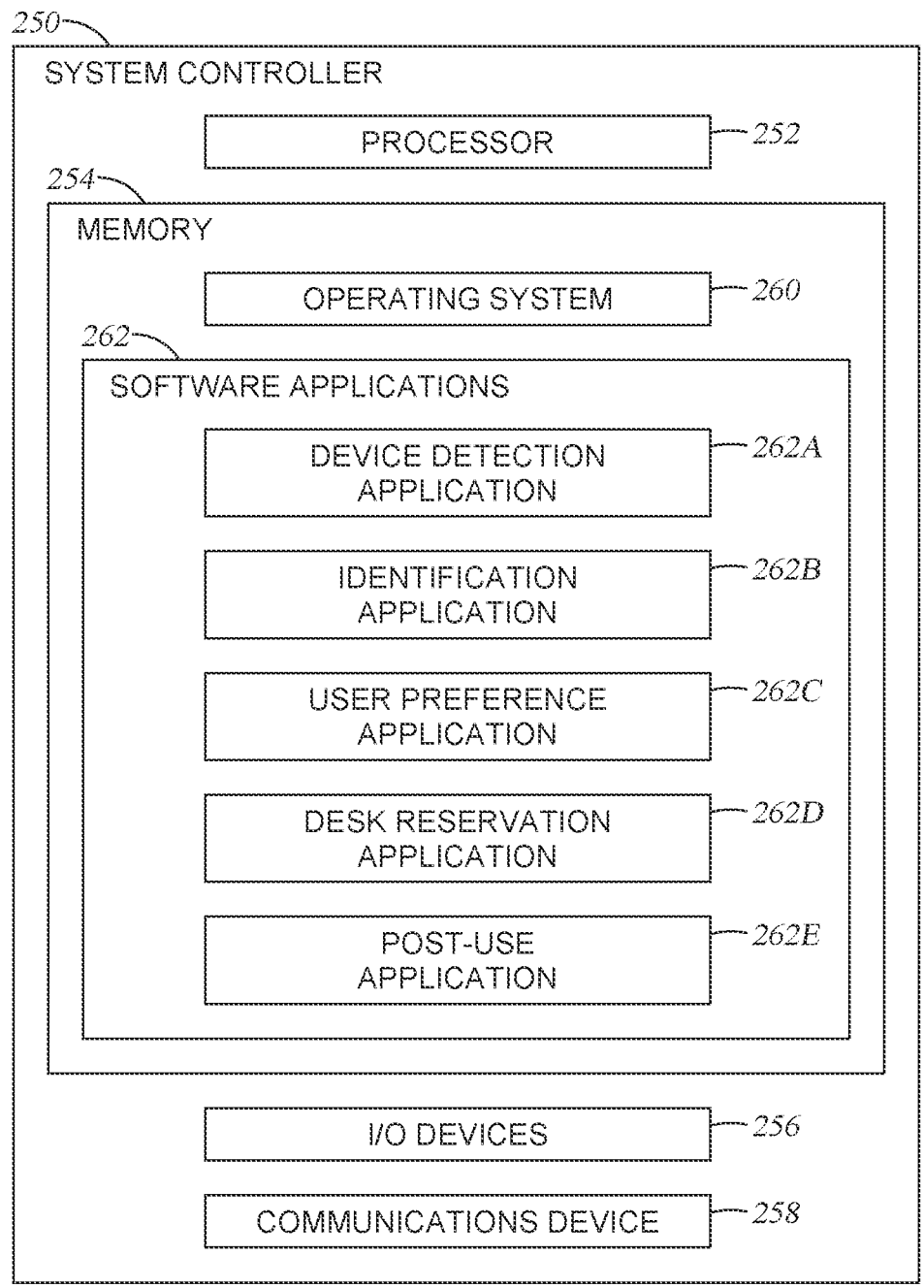
FIG. 2B is a schematic representation of a controller of the electronic device depicted in FIG. 1D, according to one embodiment.

FIG. 2B is a schematic representation of a controller 250 of the electronic device 121 depicted in FIG. 1A, according to one embodiment.

Here, operation of electronic device 121 and processing of data received various sources is facilitated by the controller 250, which then transmits the data to processing device 105. Generally, controller 250 includes a processor 252, memory 254, input/output (I/O) devices 106, and a communications device 258, which are operably coupled to one another using one or more support circuits (not shown). In some embodiments, a combination of two or more of processor 252, memory 254, I/O devices 256, and communications device 258 are coupled together.

Processor 252 may be any one or combination of a programmable central processing unit (CPU), a graphics processing unit (GPU), a digital signal processor (DSP), an image signal processor (ISP) that is a specialized DSP used for image processing, a programmable gate array (FPGA), an application-specific integrated circuit (ASIC), a neural network coprocessor, or other hardware implementation(s) suitable for performing the methods set forth herein, or portions thereof. Memory 254, coupled to processor 252, is non-transitory and represents any non-volatile type of memory of a size suitable for storing one or a combination of an operating system 260 and one or more software applications 262.

Memory 254 can be any technically feasible type of hardware unit configured to store data. For example, memory 254 includes some form of non-volatile memory, such as a hard disk, a random access memory (RAM) module, a flash memory unit, or a combination of different hardware units configured to store data. In some embodiments, memory 254 includes memory devices external to controller 250 and in communication therewith. In some embodiments, at least one of the one or more software applications 262 are executable by processor 252 to perform one or more of the methods set forth herein, which advantageously simplifies integration across generally available video conferencing software applications. In other embodiments, one or more of the methods may be executed by one of a general-purpose computer or a custom technological device external to electronic device 121 and in wired or wireless communication therewith. In some embodiments, the one or more software applications 262 stored in memory 254 include instructions which, when executed by processor 252, are configured to perform one or more of the methods described herein.

Software applications 262 can be configured to run in the foreground or background on electronic device 121. Software applications 262, which each include computer implemented instructions, that when executed by the processor 252 are used to control one or more activities being performed by electronic device 121 and/or provide some useful input to user 110 via audio or visual means provided by processing devices 105. Software applications may include various applications to perform various functions. For example, a device detection application 262A detects when a device is connected to electronic device 121. For example, a user identification application 262B determines an identity of user 110. For example, user preference application 262C applies preferences of user 110 to devices. For example, a desk reservation application 262D coordinates availability of desks 120 and may generate, maintain, and use a user activity file (e.g., list of desks 120) to process a request and/or reservation for a desk 120. In one example, the user activity file may include a calendar to track availability and reservations for desks 120. For example, a post-use application 262E determines when user 110 is finished using desk 120. Although some examples of software applications 262 are provided, they are not exclusive and not meant to be limiting.

I/O devices 256 can include peripheral devices 130, processing devices 105, user devices 132, and the like (e.g., display screen 142 or a display screen of processing device 105. I/O devices 256 can also include one or more timing devices, such as a clock (not shown), that are configured to provide time related information to the processor 252 within controller 250. The clock can be a simple integrated circuit (IC) or similar component, such as a crystal oscillator.

Communications device 258 is generally configured to facilitate the transfer of data (e.g., data on an identity of user 110, data on a preference of user 110, data on peripheral devices 130 connected to electronic device 121) to processing device 105 and/or host device 145 for consideration. Electronic device 121 may receive and transmit the data using conventional communication devices and protocols (e.g., network interface card, Ethernet card, modem, wireless network hardware, or other conventional computing device communication hardware).

In one embodiment, controller 250 outputs a notification signal regarding the availability of desk 120 through communications device 258 and/or to an I/O device 256 (e.g., display screen 142 or a display screen of processing device 105). In some embodiments, as discussed below, the controller 250 outputs a notification signal which causes the illumination of the indicator light 144, which signifies the status of the desk 120. In other embodiments, electronic device 121 further includes a user interface (e.g., display screen 142) disposed in wired or wireless communication (e.g., Wi-Fi, Bluetooth®) with controller 250. The user interface may be used to manually override at least some of the methods set forth herein when manual control over electronic device 121 is so desired.

Although described separately above, it is contemplated that any combination of the individual components and functions of controller 250 may be included in and/or performed by electronic device 121 and vice versa, including the execution of the one or more software applications 262 for performing any one or combination of the methods set forth below.

Graphical User Interfaces for Electronic Devices

FIGS. 3A-3D illustrate examples of different GUIs 300 of display screen 142 from FIG. 1D, according to one embodiment. GUIs 300 provide an interface between processing device 105 and electronic device 121.

Figure 3A:
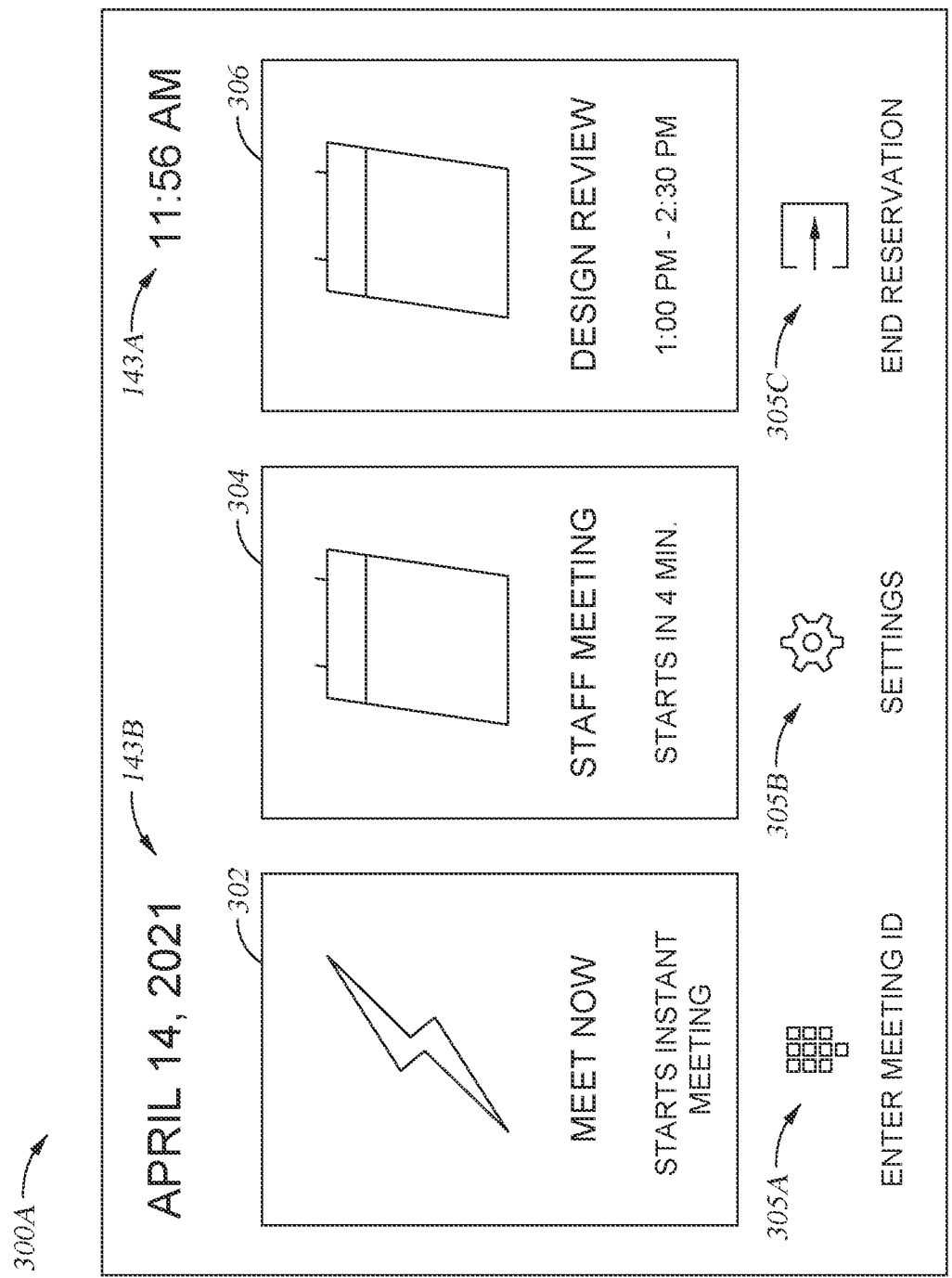
FIGS. 3A-3D illustrate examples of graphical user interfaces of the display screen from FIG. 1D, according to one embodiment.

FIG. 3A illustrates a GUI 300A reflective of user's 110 upcoming events. In this embodiment, electronic device 121 is linked to a calendar of user 110 (e.g., a calendar in Microsoft Outlook, Apple iCloud Calendar, or Google Calendar and the like) containing virtual meetings. In some embodiments, such as described in FIG. 1D, electronic device 121 links to the calendar through processing device 105 such that the processing device 105 acts as an agent for electronic device 121 to access calendar information. GUI 300A includes time 143A and date 143B. GUI 300A includes several selectable areas for user 110 to interface with electronic device 121. User 110 may select an area by touching the area (e.g., when display screen 142 is a touch screen) or clicking the area (e.g., if electronic device 121 is configured to interface display screen 142 with mouse 130A). In this example, area 304 displays information about a meeting on user's 110 calendar that is about to start including the meeting name and a period of time remaining until the meeting starts. This places a reminder of the meeting within user's 110 peripheral while user is at desk 120 and beneficially ensures user 110 does not forget to attend the meeting. User can select area 304 to join the meeting. In other embodiments, selecting area 304 brings up a different GUI 300B as discussed in FIG. 3B.

Area 306 displays information about a next meeting on user's 110 calendar that is after the meeting of area 304 including a meeting name and a time of day the meeting will occur. This beneficially alerts user 110 of future meetings. Selecting area 306 may bring up details on and/or options for the meeting. For example, user 110 is presented with a list of invitees and/or attendees, a meeting agenda, and/or options to cancel or reschedule the meeting.

Area 302 provides a means for user 110 to start a meeting on demand. Selecting area 302 starts a new meeting. In some embodiments, selecting area 302 brings up information on how to join the meeting that can be shared with another user 110 such as a meeting ID and/or passcode. In other embodiments, selecting area 302 allows user 110 to invite other users 110 to the meeting or automatically adds other users 110 to the meeting.

In other embodiments, additional options appear on GUI 300A when areas 302, 304, or 306 are selected. For example, when area 304 is selected, areas 305A, 305B, and 305C appear which allow user 110 to enter the meeting ID, manage settings for meeting and/or electronic device 121, and cancel a reservation to attend the meeting, respectively. Areas 305 may change depending on which area 302, 304, or 306 is selected, may be the same for all areas, or some combination of the two.

Figure 3B:
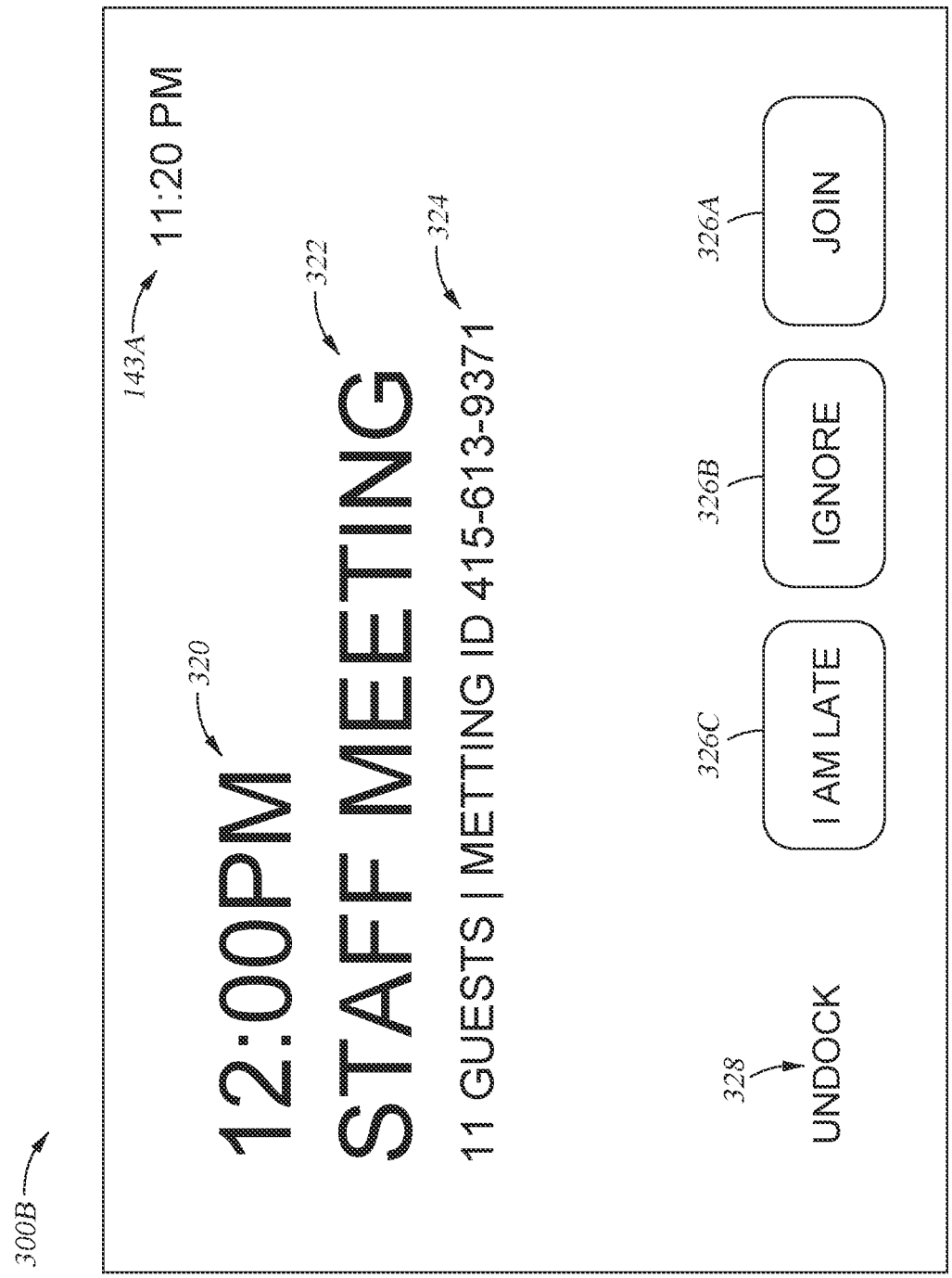

FIG. 3B illustrates a GUI 300B that displays information about a meeting on user's 110 calendar closest in time to a present time 143A. In this example, the meeting is underway. GUI 300B displays a start time 320 for the meeting, a meeting name 322, and additional information 324 about the meeting such as number of attendees and a meeting ID. GUI 300B displays different selectable areas 326 corresponding to different actions a user may take regarding the meeting. For example, user 110 may select area 326A, 326B, or 326C to join the meeting, delay entering the meeting, or ignore the meeting, respectively. In certain embodiments, selecting area 326A joins the meeting and brings up another GUI with in-meeting controls as discussed in FIG. 3C. In other embodiments, selecting area 326B alerts other attendees of the meeting that user 110 is running late.

Selecting area 328 allows user 110 to undock, unlink, or otherwise disconnect processing device 105 from electronic device 121. This beneficially allows user 110 to remove processing device 105 in one click while ensuring processing device 105 safely disconnects. In certain embodiments, selecting area 328 displays a similar GUI or areas (e.g., areas 326) on processing device 105 such that user 110 can beneficially address the meeting after disconnecting from electronic device 121.

In certain embodiments, display screen 142 automatically displays GUI 300B when a meeting is underway or a predetermined time period before meeting start time 320. In some embodiments, GUI 300B syncs with user's 110 calendar such that GUI 300B is displayed at a meeting reminder time that is included with a meeting invite. Thus, GUI 320B and areas 326 beneficially allow user 110 to address a meeting in one click.

Figure 3C:
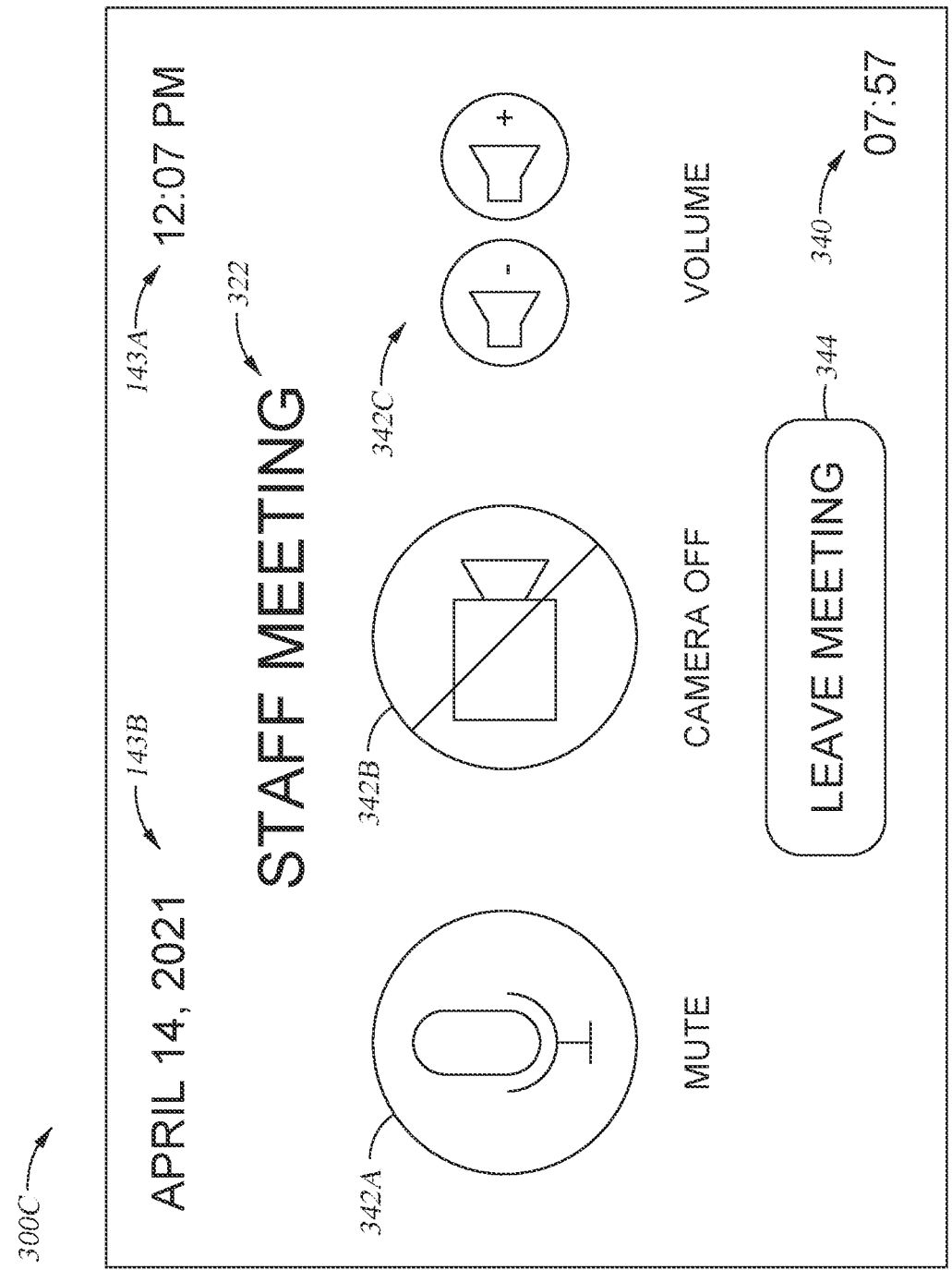

FIG. 3C illustrates a GUI 300C that displays controls to be used while user 110 is in a meeting. In this embodiment, GUI 300C displays a time period 340 user 110 has participated in the meeting. In other embodiments, time period 340 is a total amount of time passed since the meeting started. GUI 300C displays different selectable areas 342 corresponding to different actions a user may take while in the meeting. For example, user 110 may select areas 342A, 342B, and 342C to mute and unmute a microphone, turn video from a webcam on and off, or adjust a volume of the meeting, respectively.

Selecting area 344 allows user 110 to leave the meeting. In certain embodiments, selecting area 344 prompts user 110 to confirm a decision to leave the meeting. In other embodiments, selecting area 344 automatically leaves the meeting. In other embodiments, other meeting attendees may or may not be notified that user 110 left the meeting.

Figure 3D:
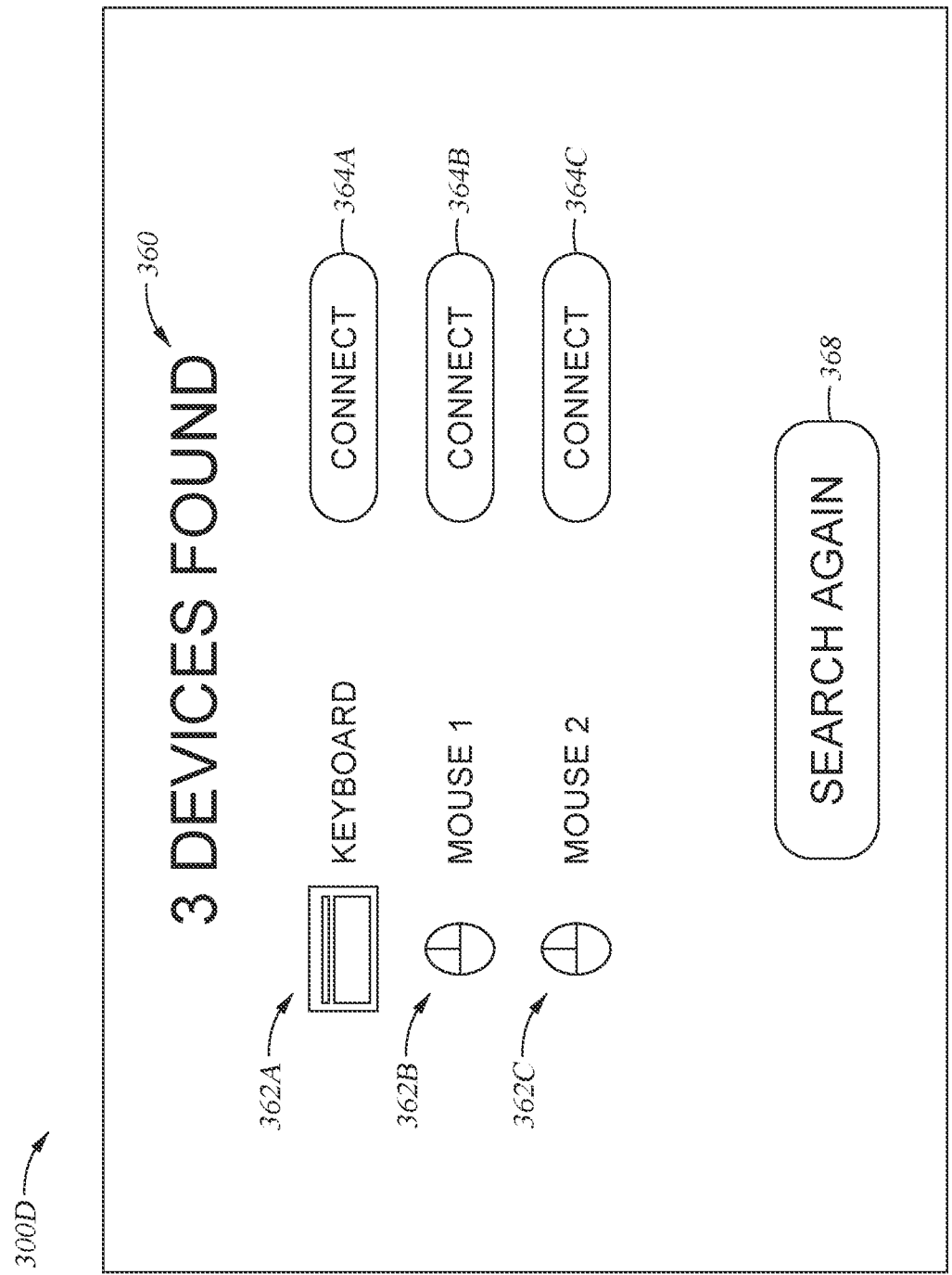

FIG. 3D illustrates a GUI 300D that displays controls to be used when multiple peripheral devices 130 and/or user devices 132 are connected to electronic device 121. In this embodiment, GUI 300D displays a quantity 360 of peripheral devices 130 and/or user devices 132 (e.g., devices 362) connected to electronic device 121. GUI 300D displays available devices 362 and corresponding selectable areas 364. For example, GUI 300D displays a keyboard 362A, a mouse 362B, and another mouse 362C. User 110 can tell electronic device 121 to use keyboard 362A by selecting area 364A, use mouse 362B by selecting area 364B, or use mouse 362C by selecting area 364C.

In certain embodiments, connecting and/or disconnecting a device 362 automatically brings up GUI 300D. If a connected device 362 is not displayed as expected, user 110 may select area 368 to have electronic device 121 search for connected devices 362.

In other embodiments, display screen 142 is used to alert other users of a status of user 110 (e.g., out to lunch, in a meeting, do not disturb, available). In certain embodiments, display screen 142 may display a photo associated with user 110 as a wallpaper or background of electronic device 121.

Methods of Claiming and Controlling the Utilization of a Desk

Figure 4:
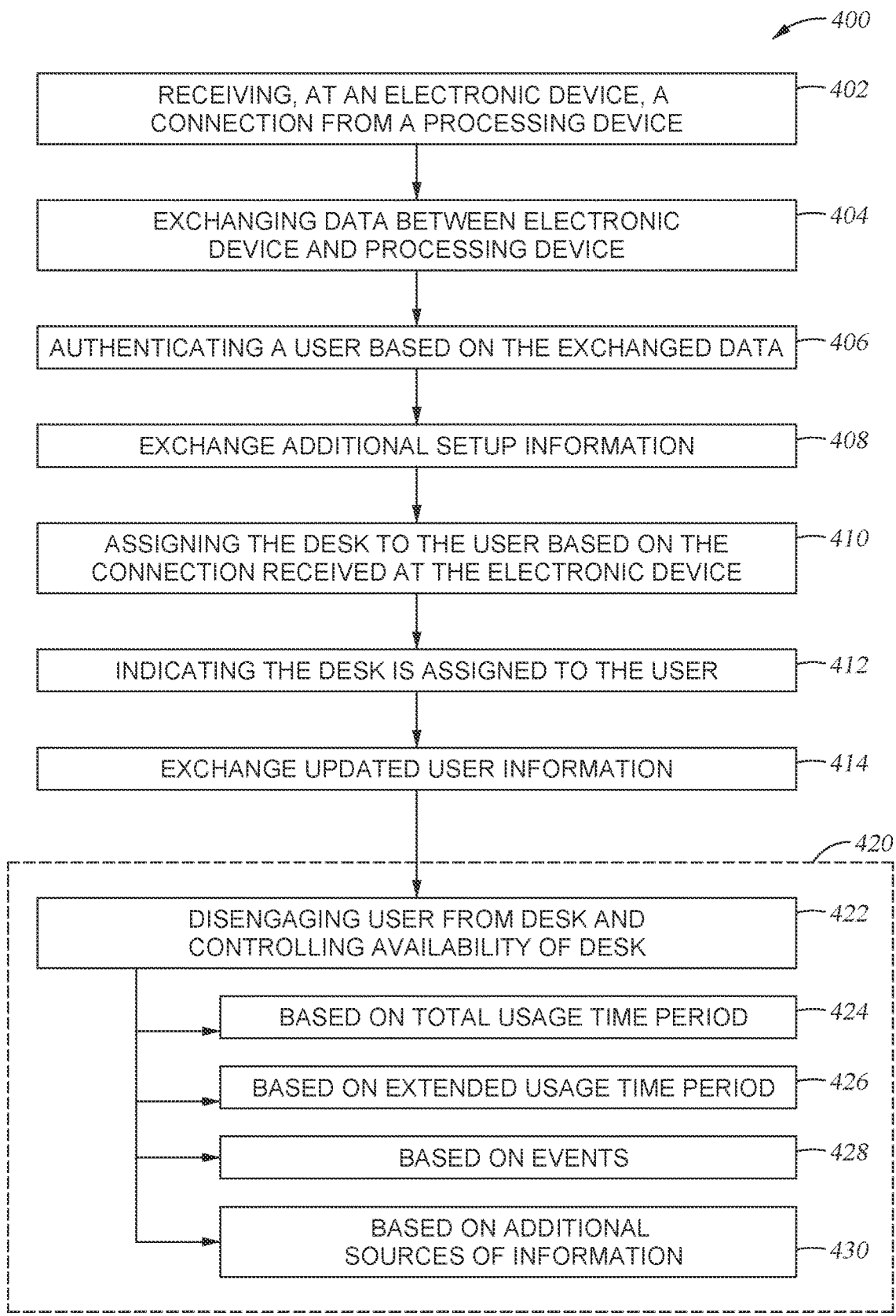
FIG. 4 is a flow diagram of a method for a user to claim a space within an environment, according to one embodiment.

FIG. 4 is a flow diagram of a method 400 for user 110 to claim desk 120, according to one embodiment. Although method 400 operations are described in conjunction with FIGS. 1A-2B, persons skilled in the art will understand that any system configured to perform method 400 operations, in any order, falls within the scope of the embodiments described herein.

In method 400, user 110 claims desk 120 by connecting processing device 105 to electronic device 121. This beneficially allows user 110 to claim desk 120 with minimal effort and without performing additional steps such as scanning a radio frequency identification (RFID) tag or quick response (QR) code or using a separate, single-purpose device. Method 400 is useful to avoid the need for direct user input or need for user identifying interaction with the electronic device 121 and electronic system 200 (e.g., entering user data into a terminal, swiping user access cards, providing QR code information, etc.), since, in some embodiments, the methods described herein only require the act of initiating communication between devices, such as by connecting the processing device 105 to the electronic device 121 to allow the subsequent operations to be performed.

Method 400 begins at operation 402, where electronic device 121 detects the formation of a connection to a processing device 105. For example, user 110 connects processing device 105 to electronic device 121 via a wired connection as described above. For example, user 110 connects laptop 150A to electronic device 121 as described in FIG. 1C. This beneficially allows user 110 to claim desk 120 by simply connecting one cable between a processing device 105, which is "on" and running, to the electronic device 121. Alternately, the user 110 can claim desk 120 by establishing a wireless connection between the processing device 105 and the electronic device 121.

In certain embodiments, software running on processing device 105 and/or electronic device 121 automatically detects when the connection is made. The process of automatically detecting the formation of the connection to a processing device 105 may be performed by use of one or more software applications running in the foreground or background of the electronic device 121 and/or processing device 105. In some embodiments, the detection process includes a sequence in which software initiated due to the detection of the connection or running in the foreground or background on the processing device 105 sends a request to the electronic device 121 requesting to connect to the electronic device 121.

In one embodiment, a device detection application (e.g., device detection application 262A in FIG. 2B) running on electronic device 121 is used to detect when the processing device 105 is connected. For example, processing device 105 sends a request to claim a desk 120 when processing device 105 connects to an electronic device 121 associated with the desk 120. A controller (e.g., controller 250 in FIG. 2B) receives the request and coordinates the request with a desk reservation application (e.g., desk reservation application 262D in FIG. 2B) to check if there are upcoming reservations for desk 120 as discussed in FIG. 5. If there is an upcoming reservation, desk reservation application 262D notifies controller 250, which alerts user 110 of the upcoming reservation. This beneficially alerts user 110 to the upcoming reservation if there is one. In one example, controller 250 outputs the notification signal through a communication device and/or to an I/O device 256 (e.g., communications device 258 and I/O device 256 in FIG. 2B). The desk reservation application 262D and controller 250 are also used to inform a user of any upcoming reservations that may impact a user's usage of the desk 120.

In other embodiments, user 110 must acknowledge the notification regarding the upcoming reservation before claiming desk 120. If there are no upcoming notifications, desk reservation application 262D notifies controller 250 and user 110 is permitted to use desk 120. In other embodiments, controller 250 alerts user 110 that there are no upcoming reservations for the day.

In other embodiments, where processing device 105 does not include software to detect formation of the connection, electronic device 121 sends a request to install software to processing device 105. In other embodiments, human interface device (HID) commands, stored within an algorithm stored within the electronic device 121, are used to detect the formation of a connection between processing device 105 and electronic device 121, which beneficially allows for detection without installation of custom, unique, or additional software on processing device 105. For example, electronic device 121 may use HID commands to announce its capabilities to processing device 105. Processing device 105 can use standard drivers that are already installed on processing device 105 to interpret the HID commands and communicate with electronic device 121.

During normal operation, while connected to electronic device 121, processing device 105 may send a first and a second, a continuous, or repeated requests to connect or verify the connection at different times. Processing device 105 may send a first and a second set, continuous sets, or repeated sets of user information to electronic device 121. Electronic device 121 monitors for and receives requests to connect or verify the connection and/or the sets of user information. The repeated or continuous requests to verify that the processing device 105 is still connected to electronic device 121 can be used to indicate that user 110 is still present at or using desk 120. In some configurations, the electronic device 121 may alternately or additionally, send repeated requests to the processing device 105 to verify the connection and that the user is still actively using the processing device 105 and desk 120.

At operation 404, based on the determination that a wired or wireless connection (e.g., communications link 128 in FIG. 1B) has been made between the electronic device 121 and the processing device 105, a one-way or two-way exchange of data occurs between the electronic device 121 and the processing device 105. In some embodiments, processing device 105 sends data associated with the identity of user 110 and software running on electronic device 121 (e.g., identification application 262B in FIG. 2B) processes the data. Data associated with the identity of a user may include information associated with the identity of a user 110 (e.g., a passcode, a user ID, a pin number, a security token, a name, a social security number, a birth date, security questions), information about processing device 105 associated with user 110 (e.g., a media access control (MAC) address, an IP address), information about a user device 132 (e.g., a serial number) that is associated with user 110, and the like. Processing device 105 may send information regarding preferences of the user 110, which is often referred to herein as user preferences. In other embodiments, user preferences are considered data associated with the user 110. Software running on electronic device 121 (e.g., user preference application 262C in FIG. 2B) applies user preferences to processing device 105 and/or electronic device 121.

In other embodiments, the process of exchanging data includes a sequence in which software initiated due to the detection of the connection or running in the foreground or background of the processing device 105 causes data to be transferred from the processing device 105 to the electronic device 121, which can include user information. Thus, in some embodiments, the process of exchanging data includes a sequence in which software running in the foreground or background of the processing device 105 automatically causes data to be transferred from the processing device 105 to the electronic device 121 due to the detection of the connection between the devices. However, in some embodiments, the electronic device 121 first automatically, based on the detection of the connection, or semi-automatically sends a request to the processing device 105 requesting that the processing device 105 send user information to the electronic device 121 through the connection. The user information can include one or more of information identifying user, user device preference information, user environmental preference information, processing device configuration data, and other useful information that can be used to configure and/or setup the desk 120 and improve the user's experience while working at the desk 120. In one example, the user identifying information can include one or more of a user's name, job department, job title, email address, residence address, representative picture, device login user name, device login password information, or other user identifying information. User preference information can, for example, include information on a user's peripheral 130 and/or user device 132 preferences, such as a preferred keyboard type, preferred keyboard shortcuts, preferred device settings (e.g., screen brightness, microphone or speaker volume, preferred webcam), or other useful information. User preference information can also include user's 110 preferred Web browser, calendar information, preferred conference room, information regarding a user's special needs, and the like. User environmental preference information can, for example, include a user's preferred working environment noise level, preferred office temperature, or other useful information. Processing device configuration data can, for example, include the device's serial number, model number, model type, operating system, device capabilities, or other useful information.

At operation 406, a user authorization process is optionally performed based on the information received from the processing device 105. The user authorization process can include a user and/or device authentication step, which will include a process or action of proving or showing that the user or device is the actual user or device that is or should be authorized to perform an activity at the desk 120. In some embodiments, operation 406 is performed by use of software running on the electronic device 121 (e.g., user identification application 262B) which compares data within the received user information to determine and/or verify the identity of user 110, such as by comparing the data received by electronic device 121 to a repository 205 of user identification data stored within a location within electronic system 200. If no match is found, identification application 262B may create a new record in the repository 205 containing the data on user's 110 identity. In other embodiments, user 110 is denied access to electronic device 121 if no match is found. If a match is found, user 110 is granted access to electronic device 121. In other embodiments, where the repository 205 contains user preferences, the software applies the user preferences to processing device 105 and/or electronic device 121 based on the match. In other embodiments, the received data for any purpose where the identity of the user 110 is useful. For example, coordinating with desk reservation application 262D to verify a user 110 is the same user 110 associated with the reservation for desk 120. Repository 205 may be on the electronic device 121, host device 145, or in a remote location as discussed in FIG. 2A, such as a local, remote, or cloud-based server.

In some embodiments, the authorization process is performed using information retrieved from the processing device 105, such as information derived from the successful login to the processing device 105 by the user, which is then compared with information contained in memory 254 by use of one or more of the software applications 262 running on the electronic device 121. In other embodiments, the software running on the processing device 105 and/or electronic device 121 can include instructions that provide a unique identifier (e.g., encrypted electronic identifier) that is tied to the electronic device 121, and thus allows a user to automatically authenticate the processing device 105 once it is connected to the electronic device 121, the data exchange occurring during operation 404 has been performed, and a comparison is made between the identifier and information stored in memory of the processing device 105 and/or electronic device 121 by use of one or more of the software applications running on the processing device 105 and/or electronic device 121. In some embodiments of operation 406, the electronic device 121 is configured to send information received from the processing device 105 to the host device 145, so that software executed by a processor in the host device 145 can perform a process of comparing the information received from the processing device 105 and electronic device 121 with user identification data stored within a location within the repository 205 within electronic system 200. After comparing, analyzing, and determining that the user and/or processing device 105 meets the authentication requirements, the host device 145 then sends authorization approval information to the electronic device 121.

Based on the received authorization approval information, and/or an authentication determination made by the electronic device itself, the electronic device 121 will "unlock" itself to allow further communication between the processing device 105 and the electronic device 121, and other devices in communication with the electronic device 121. A failure of the authorization process performed in operation 406 can be used to: prevent unauthorized processing devices 105 and/or users from taking over the desk 120; causing harm to one or more components within the desk 120; prevent communication between the processing device 105 and peripheral devices 130; and/or prevent the method 400 from proceeding forward.

Alternately or additionally, in some embodiments of operation 406, software executed by a processor in the host device 145 is configured to perform a process of comparing the information received from the processing device 105 and electronic device 121 with work area assignment information for one or more work areas that is stored within a location within the repository 205. Work area assignment information will generally include work area reservation information and information relating to the user that reserved the work area. Work area reservation information can include information relating to a reservation time, a reservation day, a reservation duration, and a work area identifier, for example. After comparing, analyzing, and determining that the user has been assigned a work area, or is permitted to take control over a work area, the host device 145 then sends authorization information to the electronic device 121. Based on the received authorization information, the electronic device 121 will "unlock" itself to allow further communication between the processing device 105 and the electronic device 121, and other devices in communication with the electronic device 121, and then perform operation 412 discussed below.

At operation 408, the processing device 105 sends additional setup information to electronic device 121 automatically, based on a request received from the electronic device 121, or after a desired time has elapsed based on the formation of the connection during operation 402. For example, in a case where user device preference information was not sent during operation 404, the processing device 105 sends information regarding how user prefers to configure electronic device 121 and/or processing device 105. In some embodiments, the processing device 105 causes the additional setup information to be sent to the electronic device 121 automatically from another device or devices, such as a cloud device. The user preferences information can be stored in a memory location within the repository 205. Electronic device 121 uses the user information received during operation 404 and/or additional setup information received during operation 408 is then used to adjust characteristics of and/or configure electronic device 121 and/or processing device 105 while user 110 is using desk 120 and processing device 105 is connected to electronic device 121. The characteristics that may be adjusted include, for example, one or more device settings for one or more of the devices associated with the desk 120, such as a particular background to display on electronic device 121 and/or processing device 105, screen brightness of electronic device 121 and/or processing device 105, setup for shortcuts on processing device 105, selecting desired default software macros or templates, configuration of certain peripheral devices 130 to use (e.g., configure headphones to use for meetings), selection of software to use for hosting meetings, and the like.

New and/or updated information of a user's preferences is saved to repository 205. In other embodiments, electronic device 121 prompts input from user 110 on what they prefer when user 110 first connects or when updated and/or conflicting information is received. Electronic device 121 may prompt user 110 with the request through a display on electronic device 121 and/or a display on or connected to processing device 105.

At operation 410, electronic device 121 assigns desk 120 to user 110 based on the formation of the connection between the processing device 105 and the electronic device 121. For example, desk 120 is assigned to user 110 once the identity of user 110 is verified during operation 406. Once assigned, the desk 120, electronic device 121, and peripheral devices 130 are available for user 110 to use. Thus, electronic device 121 acts as a gateway between user 110 and desk 120 and its peripheral devices 130. In some embodiments, during operation 410 the data exchanged during operation 404 is used to allow the automatic login into one or more devices attached to the electronic device 121 based on the authorization process performed during operation 406.

At operation 412, electronic device 121 indicates desk 120 is assigned to user 110. In some embodiments, electronic device 121 generates a notification signal that desk 120 is assigned to user 110. In other embodiments, the indication or notification that a desk 120 has been assigned is completed by delivery of an electronic signal (e.g., notification signal) to a peripheral device connected to the electronic device 121 and/or by the generation of visual stimuli or even audible stimuli. In one example, electronic device 121 is configured to generate visual stimuli, such as the illumination of an indicator light 144 as discussed in relation to FIG. 1D. For example, the indicator light lights red once desk 120 is assigned to user 110. In other embodiments, the visual stimuli may additionally or alternately include the display of a message on a display, monitor or screen (e.g., computer monitor 130C) attached to the electronic device 121.

In other embodiments, electronic device 121 delivers an electronic signal to the host device 145 to thereby let the host device 145 know that the desk 120 has been assigned. For example, electronic device 121 notifies host device 145 to update a user activity file (e.g., ledger), which includes information relating to the desk 120 usage within the environment, to reflect the assignment of desk 120 to a user 110. The user activity file tracks in real time which desks 120 are available for use and may be used to assign desks 120 to users 110 as discussed in FIG. 5. In other embodiments, electronic device 121 delivers an electronic signal to the host device 145 and one or more additional electronic devices 121 to thereby let the host device 145 and other users that are connected to the other electronic devices 121 know that the desk 120 has been assigned. In other embodiments, the identification of a user 110 can be broadcast to some or all of the other users 110 on a continuing or intermittent basis. This beneficially allows other users 110 to locate user 110.

At operation 414, the processing device 105 sends updated user information to electronic device 121 automatically, based on a request received from the electronic device 121, or after a desired period of time has elapsed based on the formation of the connection during operation 402. In one embodiment, the updated user information sent by the processing device 105 can be initiated by a request from the electronic device 121 after the electronic device 121 determines that a period of time has elapsed from a time when the user information is received by the electronic device 121 during operation 404. The updated user information sent during operation 414 is configured to further adjust or modify the information received during operations 404 and/or 408. For example, user device preference information that has been updated after one of the operations 404-412 have been performed, such as after operation 410 or 412 has been performed, the processing device 105 sends updated or additional information generated by the interaction with the user regarding how user prefers to configure electronic device 121, processing device 105 or one or more peripheral devices 130. The updated user preferences information can be stored in a memory location within the repository 205. One or more software applications running on the electronic device 121 uses the user information received during operation 414 to adjust characteristics of and/or configure electronic device 121 and/or processing device 105 while user 110 is using desk 120 and processing device 105 is connected to electronic device 121. In some embodiments, the characteristics that are adjusted and the amount of adjustment that is made during this operation is based on a difference that is determined from a comparison of the updated user information and other information (e.g., user preference information) stored in memory of the electronic device 121 and/or repository 205. In some embodiments, the adjustment and the amount of adjustment is initiated and/or performed by the delivery of a command signal (e.g., HID based commands) that is provided from the electronic device 121 to one of the peripheral device 130, which directly or indirectly causes components within an operating system (OS), such as associated drivers, to cause a change in a characteristic of the peripheral device 130. In some embodiments, processing device 105 and electronic device 121 can use communication protocols, such as Bluetooth HID, serial HID, or Zigbee, to facilitate communication between peripheral devices and the electronic device 121 and communication between the processing device 105 and electronic device 121. In some embodiments, operation 414 is performed multiple times while the desk 120 is assigned to the user and processing device 105 is connected to electronic device 121. In one example, the updated user information is transferred between the processing device 105 and the electronic device 121 at least two or more times after operations operation 410 or 412 has been performed. The transfer of the updated user information during operation 414 to electronic device 121 can be used by the electronic device 121 to determine that the user is still occupying and/or using the desk 120.

At operation 420, several actions can occur at the end of the user's need to occupy the desk 120. Operation 420 can include one or more steps that allow the user 110 to disengage from the desk 120 and halt generation of the notification that desk 120 is assigned to user 110. Operation 420 and the resulting actions may be configured by an IT manager. For example, the IT manager configures electronic system 200 such that operation 422 executes and an assignment of desk 120 to user 110 is terminated, canceled, or revoked when any one or more of operations 424-430 occur. The IT manager may also customize or define criteria of operations 424-430 or set up additional operations to execute operation 422.

In one embodiment, at operation 422, a user 110 disconnects processing device 105 from electronic device 121. Software running on electronic device 121 (e.g., post-use application 262E in FIG. 2B) detects user 110 is no longer using desk 120 through several methods including operations 424-430. In certain embodiments, after performing either of the operations 424-430 within operation 420 of method 400 one or more indications are provided that desk 120 is no longer assigned to user 110. For example, the indicator light lights green once desk 120 is no longer assigned to user 110. In another example, operations 410 and 412 are halted and/or a notification signal is sent out that the desk 120 is no longer in use and/or assigned to user 110. Desk 120 is then released from user 110 and made available for use by another user.

In some embodiments, the method 400 includes operation 424, which is used to control the availability of desk 120 by the passage of time. For example, desk 120 is assigned to user 110 for a predetermined time period, which is often referred to herein as the total usage time period. Once the total usage time period lapses, desk 120 is no longer assigned to user 110. In other embodiments, user 110 determines the predetermined time period. In other embodiments, electronic device 121 presents user 110 with a warning before the predetermined time period lapses. The total usage time period can be a setting (i.e., total usage time period set point) that is stored in memory of the electronic system, and used by the electronic system to determine that the time limit has been reached.

In some embodiments, the method 400 includes operation 426, which is used to control the availability of the desk 120 for a predetermined time period after processing device 105 disconnects, which is often referred to herein as the extended usage time period. Use of the extended usage time period beneficially allows user 110 to maintain assignment of desk 120 in case processing device 105 accidentally disconnects from electronic device 121 or user 110 decides to resume using desk 120 within the extended usage time period. In one example, the extended usage time period is beneficially used to prevent a user 110 from losing the assignment of the desk 120, since, for example, they took a break, were in a meeting that ran longer than planned or went to lunch or dinner. The extended usage time period can be a setting (i.e., extended usage time period set point) that is stored in memory of the electronic system, and used by the electronic system to determine that the time limit has been reached.

In some embodiments, method 400 includes operation 428, which is used to control the availability of desk 120 until an event occurs, which is often referred to as restricting from use and/or flagging. For example, desk 120 is restricted from use and/or flagged in the user activity file until someone cleans and/or sanitizes desk 120. For example, desk 120 is unavailable until maintenance occurs such as updating software on electronic device 121, updating software on peripheral devices 130, and/or replacing peripheral devices 130 that are improperly functioning or missing.

In some embodiments, method 400 includes operation 430, which uses additional sources of information to determine whether desk 120 is no longer assigned to user 110. For example, electronic device 121 connects with a digital calendar of user 110 such as by accessing a Microsoft Outlook calendar through processing device 105. The calendar indicates user 110 has a meeting around a time when processing device 105 disconnects from electronic device. Desk 120 remains assigned to user 110 during the meeting and for a predetermined time period after the meeting, which is often referred to herein as the transition time period. If processing device 105 does not connect to electronic device 121 during the meeting time or the transition time period after the meeting, then desk 120 is released and no longer assigned to user 110.

In some embodiments of operation 430, it is determined that the desk 120 is no longer in use based on operation 414 not being performed for a period of time, or in other words not receiving updated user information for a specified period of time. The specified period of time that a user information update has not been received can be a setting (i.e., information update time period) that is stored in memory of the electronic system, and used by the electronic system to determine that the time limit has been reached.

For example, additional sensors are used with electronic system 200 such as a pressure sensor integrated into a chair or an anti-fatigue mat of desk 120 to detect whether user 110 is present at desk 120. For example, a proximity sensor is used to detect whether user 110 is present at desk 120. For example, a webcam is used to monitor whether user 110 is present at desk 120 using a tracking or facial recognition application. For example, electronic system 200 relies on crowdsourcing to verify whether user 110 is present at desk 120 such as prompting another user 110 near desk 120 of user 110.

In some embodiments of operation 420, after it is determined that the desk 120 is no longer being used the electronic system 200 halts the generation of the notification that desk 120 is assigned to user 110. In one example, the indication or notification that a desk 120 is no longer being used is completed by delivery of an electronic signal (e.g., notification signal) to a technological device connected to the electronic device 121 and/or by the generation of visual stimuli or even audible stimuli. In one example, electronic device 121 is configured to generate visual stimuli, such as the illumination of an indicator light 144 as discussed in relation to FIG. 1D and/or the display of a message on a display attached to the electronic device 121. For example, the indicator light emits a green wavelength of light from an LED once desk 120 is assigned to user 110 and a red wavelength of light from an LED once the desk 120 is no longer being used. In another example, the indicator light emits a green wavelength of light from an LED once desk 120 is assigned to user 110, a red wavelength of light from an LED once the desk 120 is no longer being used and before it has been cleaned, and a blue wavelength of light from an LED once the desk 120 is in a "clean state," such as a state where the desk 120 has been cleaned (e.g., exposed surfaces were wiped down) or has remained idle for a period of time.

Methods of Reserving a Desk

Figure 5:
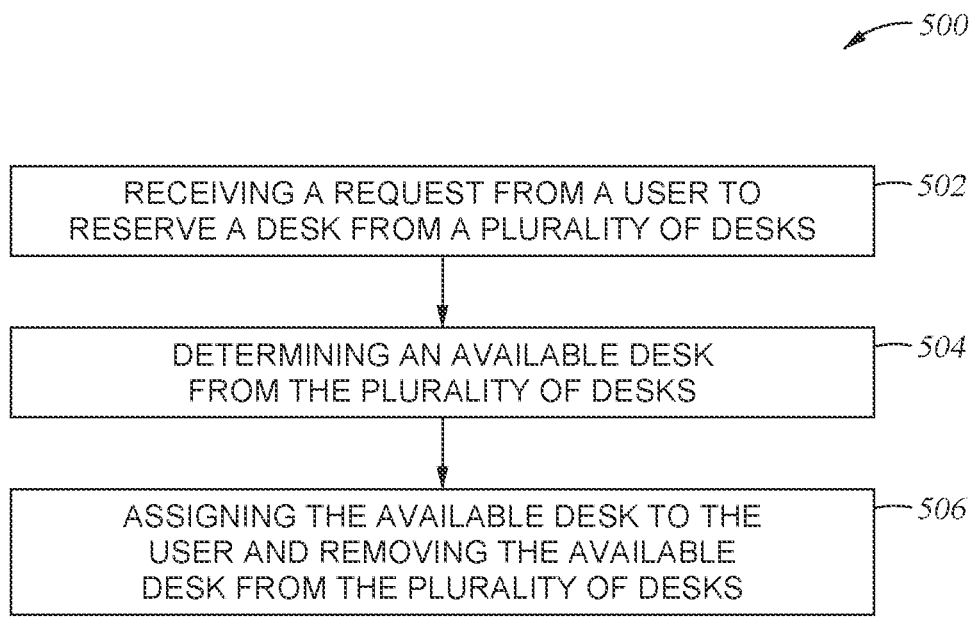
FIG. 5 is a flow diagram of a method for a user to reserve a space within an environment, according to one embodiment.

FIG. 5 is a flow diagram of a method 500 for user 110 to reserve desk 120, according to one embodiment. Although method 500 operations are described in conjunction with FIGS. 1A-2B, persons skilled in the art will understand that any system configured to perform method 500 operations, in any order, falls within the scope of the embodiments described herein.

Method 500 allows user 110 to reserve a desk 120 without connecting to electronic device 121 as discussed in relation to FIG. 4. For example, user 110 may use a web-based interface or a smartphone app to execute any of or all of the steps of method 500 and access the desk reservation system of electronic system 200, which includes the user activity file (e.g., ledger), which includes information relating to the desks 120 previously discussed in FIG. 4. The smartphone app may be optionally installed on user's 110 smartphone (which may be a processing device 105) as part of electronic system 200. In other embodiments, method 500 may use a software application installed on processing device 105 to predict desk's availability or to help select a desk 120 for user 110. In other embodiments, user 110 may access a floor plan through the desk reservation system to visualize the location and availability of desks 120 in an environment (e.g., environment 100 in FIG. 1A). For example, the floor plan may look similar to the layout presented in FIG. 1A.

Method 500 begins at operation 502, where electronic system 200 receives a request from user 110 to reserve a desk 120 from a plurality of desks 120 through a desk reservation system. In certain embodiments, the request is handled by the host device 145. In other embodiments, the request is handled by the Internet environment discussed in FIG. 2A. In other embodiments, the request is handled by the cloud-based environment discussed in FIG. 2A. In other embodiments, the request is handled by at least one of the electronic devices 121.

In certain embodiments, the request may be for a specific desk 120 in environment 100 as described in FIG. 1A. In other embodiments, the request may be for a desk 120 in a portion 100P of environment 100 as described in FIG. 1B. For example, user 110 requests a desk that has a desired attribute or function, such as a desk 120 that is positioned amongst the design team or is position in a specific room. In other embodiments, the request may be for a desk 120 that meets user's 110 preferences. For example, user 110 prefers to sit close to a restroom, in a quiet area, near a window, in a cooler area, in a darker area, in a room with a single desk 120 and a door, near an exit, or next to a specific user. The user activity file may track which desks 120 a specific user uses over time and update a file within repository 205 with user data to reflect what desks 120 a specific user uses most. Thus, operation 502 can use a user's preferences and previous desk usage to decide which desk to reserve for the user, which beneficially allows user to reserve a desk 120 in one step with a mere request.

At operation 504, method 500 determines an available desk 120 from the plurality of desks 120 to reserve for user 110. Method 500 uses information provided by user 110 in the request of operation 502 to determine a suitable desk 120 for user 110. For example, operation 504 checks if the specific desk 120 is available, if a desk 120 is available in a portion 100P of environment 100, and/or if a desk is available that meets the user's 110 preferences. Software running on electronic devices 121 (e.g., desk reservation application 262E in FIG. 2B) may communicate with electronic system 200 (e.g., host device 145) to coordinate the availability of desks 120. As discussed in FIG. 3A, electronic devices 121, and thus electronic system 200, may access users' 110 calendars through connected processing devices 105 and/or a repository (e.g., repository 205 in FIG. 2A) and may use this information to determine if a desk will be available at a later time. In other embodiments, if a desk 120 is not available that meets the user's 110 request, then an alternative desk 120 may be recommended to user 110. User 110 may also be notified that the preferred desk 120 is not available and asked to request another desk 120. User 110 then selects a different available desk 120.

At operation 506, method 500 assigns available desk 120 to user 110 and removes an available desk 120 from the plurality of desks 120. In certain embodiments, the previously available desk 120 is assigned to user 110, and thus is reserved, for a predetermined time period as discussed in FIG. 4. Operation 506 then removes the previously available desk 120 from the plurality of desks 120 during the predetermined time period such that another user 110 cannot select the previously available desk 120 during the predetermined time period. In certain embodiments, the previously available desk 120 is reserved for a set time period before and/or after the predetermined time period. This beneficially prevents another user 110 from encroaching on user's 110 reservation and/or allows for additional actions to first occur as discussed in FIG. 4.

In other embodiments, electronic device 121 indicates desk 120 is assigned to user 110 using an indicator light 144 as described in FIG. 4. For example, indicator light 144 lights red during the set time period before the user's 110 reservation to prevent other users from using the previously available desk 120. In other embodiments, display screen 142 of electronic device 121 indicates user's 110 upcoming reservation to alert other users 110.

In other embodiments, the smartphone app automatically communicates with electronic system 200 and checks for available desks when user 110 is in or near the environment. For example, a smartphone may alert the electronic system that user 110 is present in the environment using a location-reporting system such as a GPS, Bluetooth®, or NFC component. The electronic system 200 may present an alert to user 110 through the smartphone app and may direct user 110 to a specific desk 120 or may automatically unlock a desk 120 as user 110 approaches the desk 120. If user 110 is in an office for the first time, the electronic system may assign the desk 120 based on the user's 110 preferences.

In other embodiments, electronic system 200 accesses user's 110 calendar to determine when user 110 may want to reserve a desk 120 and automatically reserves desk 120 for user 110. For example, user 110 may have a reoccurring meeting on user's 110 calendar and user 110 may typically claim or reserve a desk 110 around the time of the reoccurring meeting. Electronic system 200 may recognize this pattern of behavior and automatically reserve desk 120 for user 110 around the time of the reoccurring meeting. For example, user 110 may have a team meeting on user's 110 calendar where everyone else attending the team meeting has reserved a desk 120. Electronic system 200 may recognize this and automatically reserve desk 120 for user 110 around the time of the team meeting.

In other embodiments, electronic device 121 verifies a user 110 is the same user 110 associated with the reservation for desk 120 when user 110 connects to electronic device 121 as described in FIG. 4.

In other embodiments, method 500 adds desk 120 to the plurality of desks 120 when user 110 is done using desk 120. In this embodiment, user 110 is done using desk when user 110 disconnects from electronic device 121. In other embodiments, such as where user has reserved desk 120, user 110 is considered to be done using desk 120 for time periods outside the predetermined time period discussed in operation 506.

In other embodiments, available desk 120 is not added to the plurality of desks 120 until an action occurs as discussed in FIG. 4. This beneficially allows for maintenance, cleaning, and/or sanitizing before and/or after user's 110 reservation.

In other embodiments, method 500 is used to assign a desk 120 on demand instead of reserving desk 120 in advance. For example, user 110 arrives at environment 100, requests a desk 120 at the reception room 101, and is recommended or assigned a desk on site. For example, user 110 uses a display showing the floor plan and available desks to select a desk 120.

Examples of Managing the Electronic System

Electronic system 200 and its components may be monitored, controlled and managed by different authorized individuals.

Figure 6A:
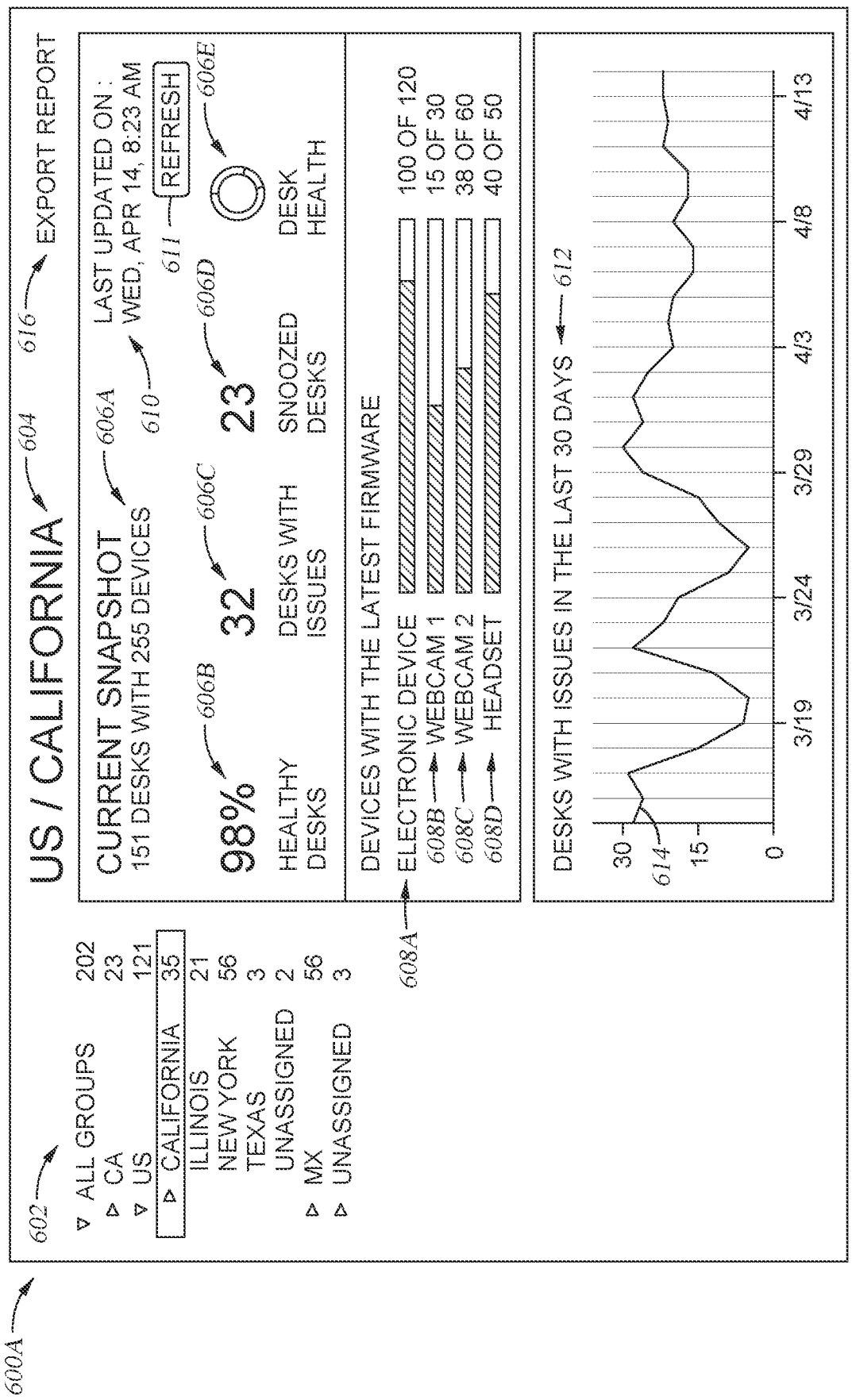
FIGS. 6A-6B illustrate examples of graphical user interfaces useful for managing the electronic system from FIG. 1D, according to one embodiment To facilitate understanding, identical reference numerals have been used, where possible, to designate identical elements that are common to the drawings. It is contemplated that elements and features of one embodiment may be beneficially incorporated in other embodiments without further recitation.

FIG. 6A illustrates a health monitoring GUI 600A for electronic system 200. In FIG. 6A, an electronic system manager, such as an information technology (IT) manager, uses GUI 600A to manage electronic system 200, electronic devices 121, peripheral devices 130, and the like.

In this embodiment, GUI 600A displays groupings 602 of desks 120. Groupings 602 may group the desks 120 within electronic system 200 by regions (e.g., such as a country or a state), by office designations (e.g., such as southwest office, hill office, headquarters office), by project teams, and/or other classifications. This beneficially allows the IT manager to maintain and analyze aspects of electronic system 200 and/or usage of electronic system 200 according to one or more of the groupings 602.

In FIG. 6A, GUI 600A displays health monitoring information for a selected group 604 from groupings 602. Health monitoring information may include information or statistics on the components of electronic system 200 such as firmware versions, driver versions, network speed and quality, video quality for webcams, device connection quality (e.g., whether there are intermittent connections), device battery life, device status (e.g., active, standby, sleep, and powered off states), general availability of desks 120 (e.g., frequency of maintenance), and the like.

In some embodiments, GUI 600A resides on a monitoring device (e.g., monitoring device 207 in FIG. 2A) and GUI 600A is generated based on communications between monitoring device 207 and desks 120 (e.g., electronic devices 121, peripheral devices 130). GUI 600A displays statuses 606 of electronic system 200 for selected group 604. For example, GUI 600A displays a desk and device count 606A that displays a number of desks 120 (whether available or in use) and devices (e.g., electronic devices 121, peripheral devices 130, and the like) connected to or disposed within the electronic system 200. For example, GUI 600A displays a percentage of healthy desks 606B such as desks 120 that are capable of being used (e.g., electronic devices 121, peripheral devices 130, and the like that are functional). For example, GUI 600A displays an amount of desks with issues 606C (e.g., an issue may be a degraded performance of the electronic device 121 where the electronic device 121 is still considered functional). For example, GUI 600A displays an amount of snoozed desks 606D (e.g., a desk 120 from desks with issues 606C that the IT manager has temporarily dismissed but not categorized as not having an issue). For example, GUI 600A displays a chart 606E illustrating a health of desks 120 (e.g., desks without issues, desks with issues, and snoozed desks).

In certain embodiments, GUI 600A displays firmware statuses 608 of devices including an amount of devices with a latest version of a firmware and a total number of devices on electronic system 200. For example, GUI 600A displays an electronic device firmware status 608A (e.g., 100 electronic devices out of 120 have the latest firmware), a first webcam model firmware status 608B (e.g., 15 webcams out of 30 have the latest firmware), a second webcam model firmware status 608C (e.g., 38 webcams out of 60 have the latest firmware), and a headset device firmware status 608D (e.g., 40 headsets out of 50 have the latest firmware). Firmware statuses 608 allow the IT manager to ensure devices are running the latest firmware, which beneficially reduces security risks and ensures a consistent experience across all desks 120. Monitoring device 207 may determine statuses 606 and 608 by communicating with peripheral devices 130, electronic devices 121, or a repository (e.g., repository 205 in FIG. 2B), which queries peripheral devices 130 for statuses 606 or 608 or logs peripheral 130 statuses 606 or 608 over time. Electronic device 121 may have a software application (e.g., software applications 262 in FIG. 2B) to communicate with peripheral devices 130 and/or report statuses 606 and 608. Status information may be stored on a memory of electronic device 121 and/or repository 205.

In certain embodiments, GUI 600A displays a given time 610 that statuses 606 and 608 were determined. In other embodiments, GUI 600A includes a selectable area 611 that allows the IT manager to query the statuses 606 and 608, on demand, at a present time, which beneficially ensures the IT manager has the most up-to-date information.

In certain embodiments, GUI 600A displays a visual 612 indicating any one or more of statuses 606 and 608. For example, visual 614 depicts a history of amount of desks with issues 606C over a previous 30 days which is stored on electronic device 121 and/or repository 205. This beneficially allows the IT manager to track a performance of electronic system 200 over a time period and see the effect of any changes, updates, or corrective measures done to electronic system 200.

In certain embodiments, GUI 600A includes selectable area 616 to export items in GUI 600A to a file such as a CSV file, PDF file, word document file, various image files including PNG and JPG, text file, and the like. Exporting beneficially allows the IT manager to share information with others and/or to import data into external hardware or software applications. Items include statuses 606 and 608, visual 614, and any other information of GUI 600A. In other embodiments, the IT manager may customize the reports to include items of their choosing.

In certain embodiments, the IT manager manages software and firmware updates for electronic device 121, peripheral devices 130, and the like. This beneficially allows the IT manager to view a health of each desk 120 and identify desks 120 with issues. In other embodiments, the IT manager similarly tracks the status of processing device 105 and/or user devices 132. In other embodiments, GUI 600A allows the IT manager to deploy and/or schedule the firmware or software updates. This beneficially allows the IT manager to access a variety of data on demand.

In certain embodiments, GUI 600A includes a selectable area (not shown) to view and/or change settings for GUI 600A. For example, the IT manager changes GUI 600A to have visual 612 display healthy desks over the time period.

In other embodiments, GUI 600A provides information on individual desks 120. For example, the IT manager selects a desk 120 with an issue and reviews details about the issue. Issues may be automatically detected by electronic system 200, such as when a peripheral 130 is disconnected from an electronic device 121 (e.g., a battery in peripheral 130 dies, a cord of peripheral 130 malfunctions).

Figure 6B:
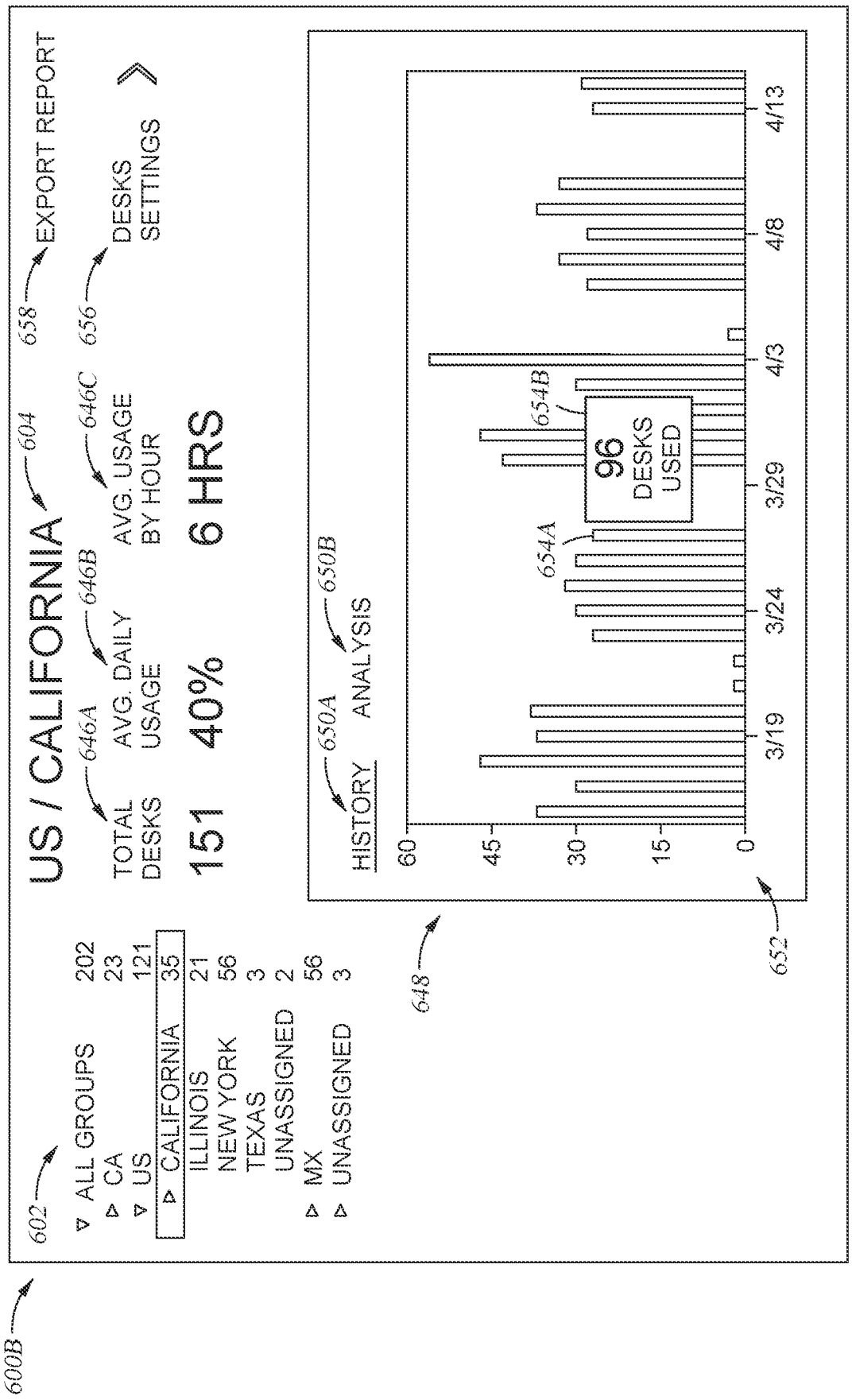

FIG. 6B illustrates a desk usage analytics GUI 600B for electronic system 200. In FIG. 6B, an electronic system manager, such as a facilities manager or a building manager, uses GUI 600B to manage electronic system 200, electronic devices 121, peripheral devices 130, and the like.

In this embodiment, GUI 600B displays usage data 646 of electronic system 200 for selected group 604. Desk usage data 646 may include information or statistics on how desks 120 are used such as which desks are used most and least, times of day when desks 120 are used the most and least, time away from desk 120 such as the extended usage time period of FIG. 4, time between when one user 110 leaves and another arrives, and the like. For example, GUI 600B displays a desk count 646A that displays a number of desks 120 (whether available or in use). For example, GUI 600B displays an average daily usage 646B of desks 120 (e.g., a percentage of number of desks 120 that are used, on average, each day). For example, GUI 600B displays an average usage 646C by hour (e.g., a period of time, in hours, that desk 120 is used, on average, by user 110).

Desk usage data 646 may provide aggregate information of every desk 120 of electronic system 200, information for each desk 120 of the plurality of desks 120, or something in between such as information for desks 120 used by a project team. Monitoring device 207 may determine desk usage data 646 by communicating with electronic devices 121 or a repository 205 (e.g., repository 205 in FIG. 2B), which queries electronic devices 121 for desk usage data 646 or logs this data over time. Electronic device 121 may have a software application (e.g., software applications 262 in FIG. 2B) to determine and report desk usage data 646.

In other embodiments, desk count 646A may include a number of other devices connected to electronic system 200. In other embodiments, average daily usage 646B and desk usage 646C may be for a period of time other than daily (e.g., weekly or monthly). Average daily usage 646B may be for a different period of time than average usage 646C.

In certain embodiments, GUI 600B displays a variable region 648. In this embodiment, variable region 648 may present different information depending on what tab is selected (e.g., a history tab 650A or analysis tab 650B). Information may include reports, trends, history, predictions, and such of desks usage data 646 and the like. Selecting history tab 650A displays a chart 652 of desk usage over a period of time (e.g., an amount of desks 120 used per each day). In certain embodiments, chart 652 is interactive such that each data point and/or day displayed is selectable and additional information is displayed based on which data point and/or day is selected. For example, the facilities manager selects a data point 654A and additional information 654B (e.g., an amount of desks 120 used for the day of data point 654A) is displayed. Chart 652 allows the facilities manager to visualize how desks 120 are used by users 110, which beneficially provides data to support decisions such as whether to increase or decrease a size of environment 100 from FIG. 1A or whether a team needs additional desks 120. Selecting analysis tab 650B displays an analysis of the usage data 646. In some embodiments, an analysis that is presented in a chart 652 includes daily trends for the desk 120 over a period of time, such as a time period that includes the last month. In one example, the analysis can include information relating to what an average usage data (e.g., number hours used, actual usage period (e.g., 9 am to 5 pm), number of requests for a desk 120, etc.) might look like for a Monday over the time period.

In certain embodiments, GUI 600B includes selectable area 656 to view and/or change settings for GUI 600B. For example, the facilities manager changes GUI 600B to display desk usage statistics by week instead of by day as previously discussed.

In certain embodiments, GUI 600B includes selectable area 658 to export items in GUI 600B to a file such as a CSV file, PDF file, word document file, various image files including PNG and JPG, text file, and the like. Exporting beneficially allows the facilities manager to share information with others and/or to import data into external hardware or software applications. Items for export include statuses 606 and 608, visual 614, and any other information of GUI 600A in FIG. 6A. In other embodiments, the IT manager may customize the reports to include items of their choosing. This beneficially allows the facilities manager to access a variety of data on demand.

In other embodiments, GUI 600B provides information on individual desks 120 such that desk usage data 646 is available on a desk by desk basis. This beneficially allows the facilities manager to view which desks 120 are used more or less and analyze a particular desk 120.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing and the like.

As used herein, the terms "automatic" or "automatically" are intended to refer to a process or an activity that by itself is performed with no direct human input or is performed in the absence of human control. The terms "semi-automatic" or "semi-automatically" are intended to refer to a process or an activity that requires at least some human input, interaction or control to cause an automated process or activity to be brought to completion.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer implemented method, comprising:
automatically initiating communication between a processing device and a first electronic device based on a user initiated connection of the processing device to the first electronic device, wherein, at the time the connection is formed, the user initiated formed connection causes a first set of user information to be transferred from the processing device to the first electronic device without additional user interaction;
transmitting, by the first electronic device, the first set of user information to a host device;
comparing the first set of user information to user identifying information that is stored in a repository;
determining that the first electronic device is permitted to communicate with the processing device based on the comparison of the first set of user information to the user identifying information;
receiving, by the first electronic device, authorization information provided from the host device;
automatically assigning a work area to the user based on the connection formed between the first electronic device and the processing device;
delivering, from the first electronic device to the host, an electronic signal indicating the work area is assigned; and
adjusting, by the first electronic device, one or more characteristics of a first external device based on the receipt of the authorization information and the first set of user information.

2. The method of claim 1, wherein the first set of user information comprises one or more characteristics of the first external device.

3. The method of claim 1, wherein the first set of user information comprises one or more of information identifying the user, user device preference information, user environmental preference information, and processing device configuration data.

4. The method of claim 3, wherein the one or more of information identifying the user comprises one or more of a name, a job department, a job title, an email address, a residence address, a representative picture, a device login user name, or a device login password information.

5. The method of claim 3, wherein the user device preference information comprises one or more of information on a peripheral preference, a user device preference, a device setting preference, a Web browser preference, calendar information, or a conference room preference.

6. The method of claim 3, wherein the user environmental preference information comprises a working environment noise level preference or an office temperature preference.

7. The method of claim 3, wherein the processing device configuration data comprises one or more of a serial number, a model number, a model type, an operating system, or a capability of the processing device.

8. The method of claim 1, wherein the receiving the authorization information comprises:
   detecting a formation of the connection between the first electronic device and the processing device; and
   comparing the at least a portion of the first set of user information with authorization information that is stored in memory.

9. The method of claim 1, wherein adjusting one or more characteristics of the first external device comprises adjusting one or more device settings of the first external device.

10. The method of claim 9, wherein the one or more device settings of the first external device comprises at least one of a particular background to display, a screen brightness, a setup for shortcuts, a desired default software macros or templates, a configuration of certain peripherals to use, or a software to use for hosting meetings.

11. The method of claim 1, wherein delivering the electronic signal indicating the work area is assigned further comprises delivering a notification signal from the first electronic device to a first peripheral device.

12. The method of claim 1, wherein the automatically assigned work area is assigned for a predetermined period of time.

13. The method of claim 1, wherein the host device receives the first set of user information from the first electronic device and receives information from a desk reservation application, wherein the desk reservation application comprises a user activity file.

14. The method of claim 13, wherein the user activity file comprises information relating to an availability of a plurality of work areas.

15. The method of claim 14, wherein information relating to an availability of the plurality of work areas further comprises at least one of information relating to a time and a day of a reservation of each of the plurality of work areas, information relating to a user associated with each reservation, and a time duration of each reservation.

16. The method of claim 11, further comprising halting the notification signal, wherein halting the notification signal is based on the expiration of a first time period.

17. The method of claim 16, wherein the first time period comprises total usage time period, an extended time usage period, or information update time period.

18. The method of claim 17, wherein the delivering of the notification signal is performed after the first electronic device receives information relating to the work area is in a clean state.

* * * * *